(12) United States Patent
Kelly

(10) Patent No.: US 8,018,079 B2
(45) Date of Patent: Sep. 13, 2011

(54) RECIPROCATING SYSTEM WITH BUOYANT AIRCRAFT, SPINNAKER SAIL, AND HEAVY CARS FOR GENERATING ELECTRIC POWER

(75) Inventor: Patrick D. Kelly, Kirkwood, MO (US)

(73) Assignee: Tetraheed LLC, St. Louis, MO (US)

( * ) Notice: Subject to any disclaimer, the term of this patent is extended or adjusted under 35 U.S.C. 154(b) by 268 days.

(21) Appl. No.: 12/390,503

(22) Filed: Feb. 23, 2009

(65) Prior Publication Data
US 2010/0213718 A1    Aug. 26, 2010

(51) Int. Cl.
*F02B 63/04* (2006.01)
(52) U.S. Cl. .............................. 290/1 R; 290/44; 290/55
(58) Field of Classification Search .................. 290/1 R, 290/44, 55; 60/495–502, 398; 417/330–333; 415/5; 416/7, 85
See application file for complete search history.

(56) References Cited

U.S. PATENT DOCUMENTS

| 4,251,040 A * | 2/1981 | Loyd ................................ 290/55 |
| 4,498,294 A * | 2/1985 | Everett ............................ 60/496 |
| 2007/0126241 A1* | 6/2007 | Olson ............................. 290/55 |
| 2010/0232988 A1* | 9/2010 | Creighton et al. ............. 417/334 |

* cited by examiner

*Primary Examiner* — Tho D Ta
(74) *Attorney, Agent, or Firm* — Patrick D. Kelly

(57) ABSTRACT

An electric generating system uses a zeppelin filled with helium or hydrogen, and a spinnaker sail, to provide pulling power that will lift a heavy railcar to an elevated height on a track, such as on a hill or mountainside, or in an elevator-type shaft in a tall building. When the heavy car reaches the top of the track, it is released, and its descent drives an electric generator. The generator can be carried by the car, and can send the power to batteries on the car, or to conductive rails. Alternately, if the car is inert weight, cables can drive stationary generators. The zeppelin will be inflated and deflated repeatedly, using equipment to recapture energy during each gas expansion, to help drive subsequent recompression into high-pressure tanks. The spinnaker sail will use a cable-handling device and spreader bars to deploy the sail and keep it at an elevated height. Various advantages are provided compared to wind turbines and pumped-storage hydroelectric facilities.

14 Claims, 6 Drawing Sheets

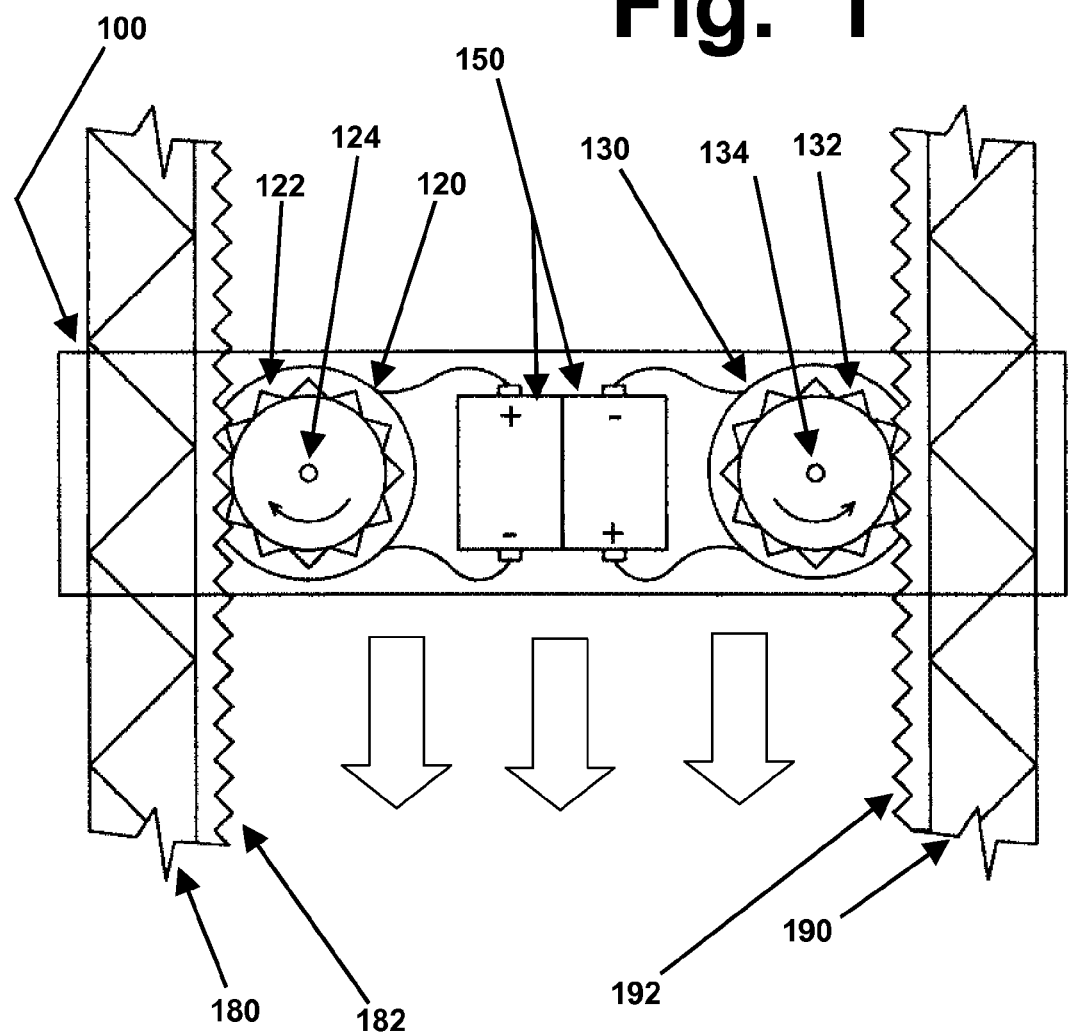

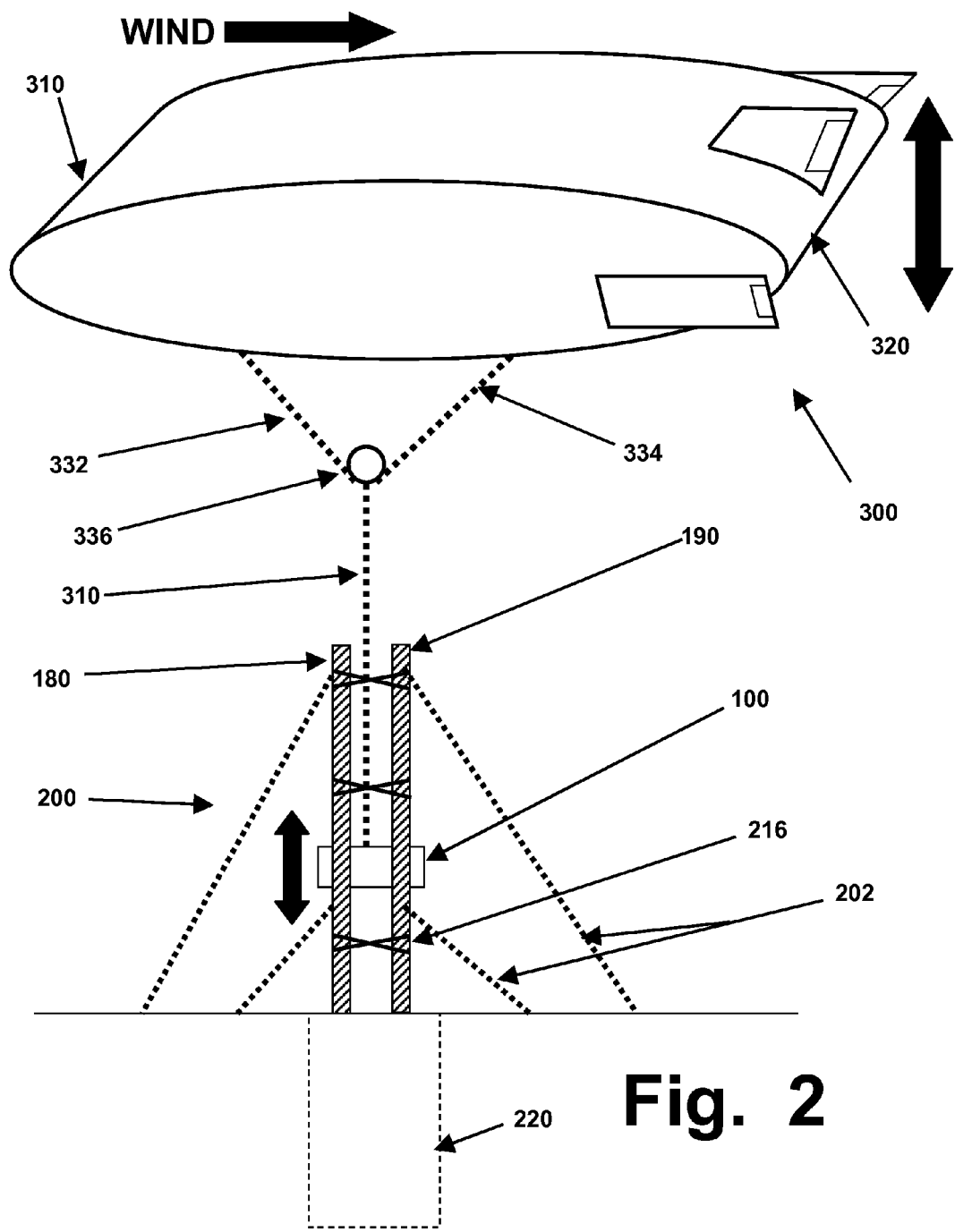

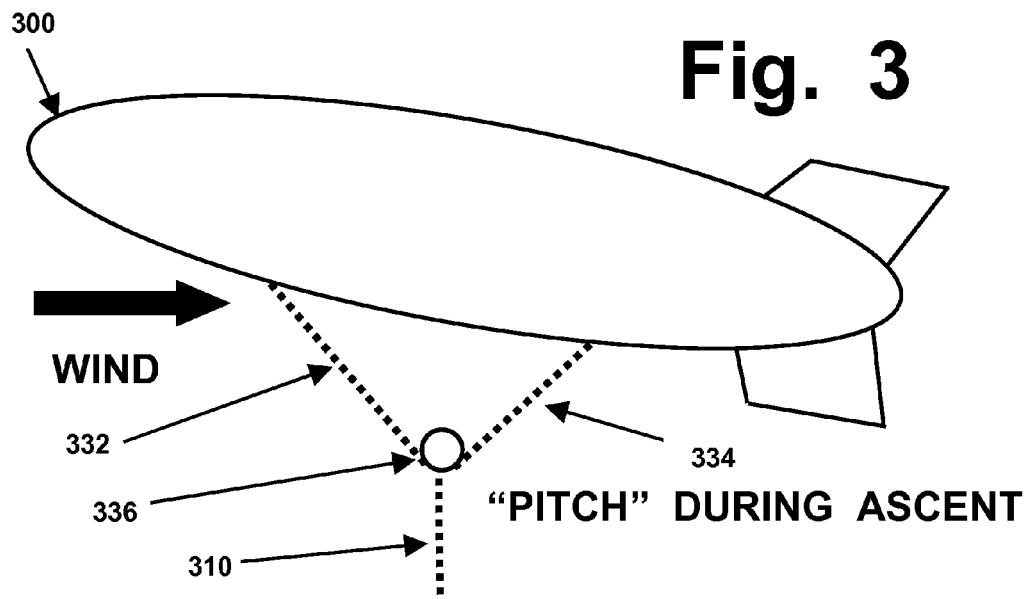
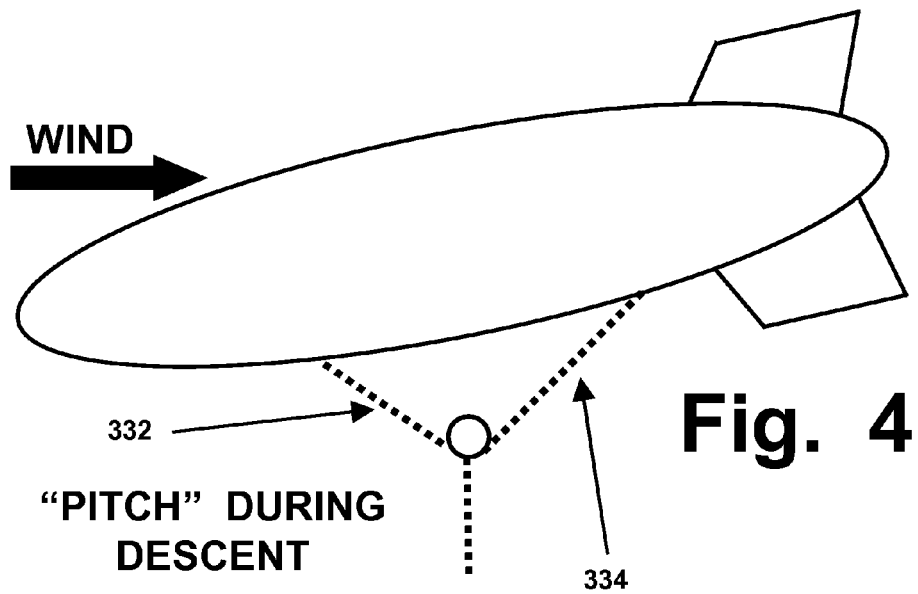

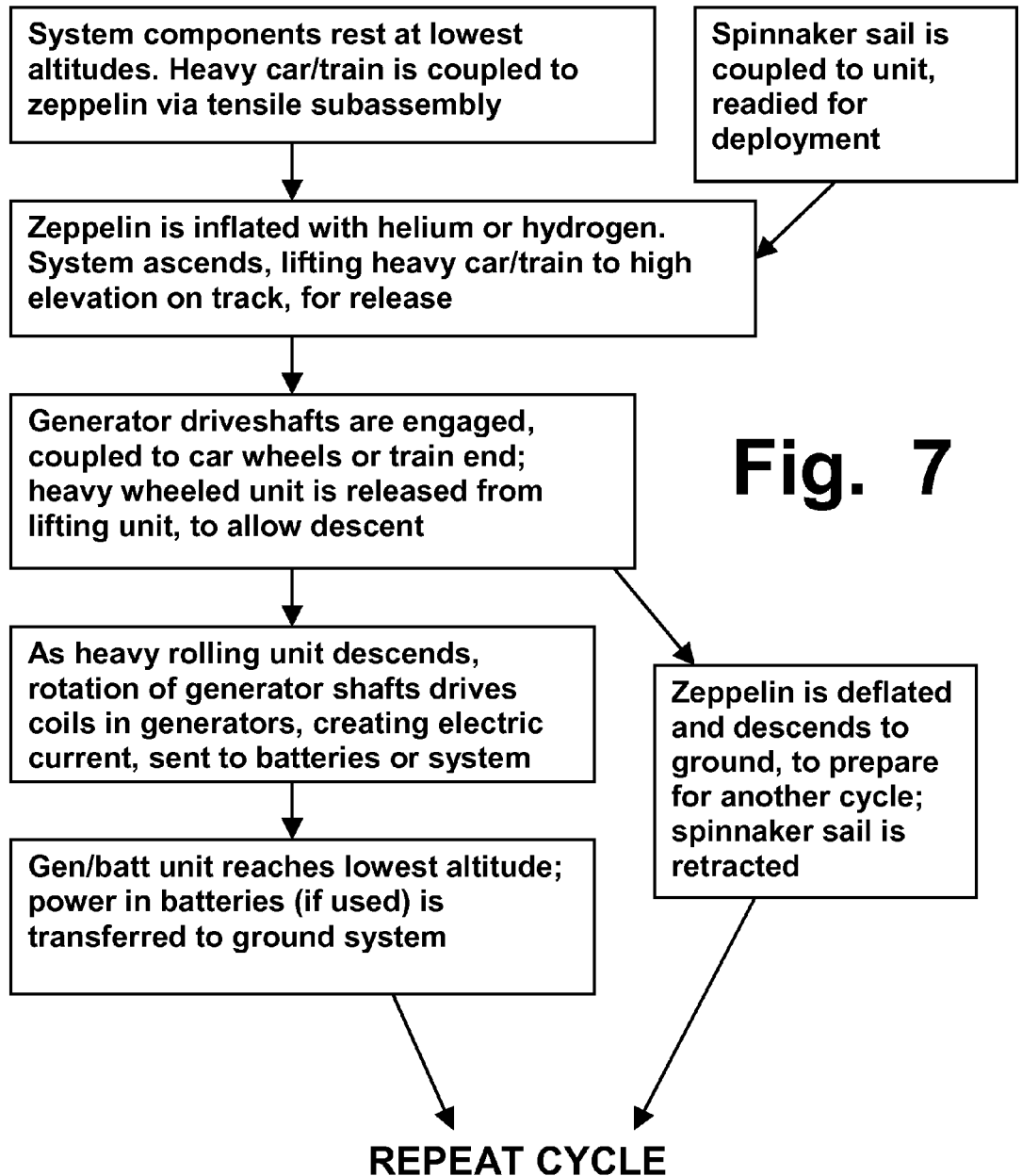

RECIPROCATING SYSTEM WITH BUOYANT AIRCRAFT, SPINNAKER SAIL, AND HEAVY CARS FOR GENERATING ELECTRIC POWER

BACKGROUND

This invention is in the field of electromechanical systems, and relates to the use of buoyant aircraft (such as zeppelins filled with hydrogen or helium) with spinnaker-type sails to generate electric power.

Several terms that apply to buoyant aircraft should be briefly addressed. These terms overlap heavily, and any of them can be applied to the types of buoyant aircraft of interest herein. However, several of these terms have potentially misleading connotations, and therefore should be avoided.

Technically, the buoyant aircraft of interest herein can be called "balloons", since they will have flexible enclosures (which also can be called envelopes, bags, skins, bladders, or similar terms) that can be reversibly inflated and deflated. However, in the context of buoyant aircraft, "balloons" tends to imply hot air balloons with spherical rather than elongated shapes, so "balloon" is not preferred for use herein.

These buoyant aircraft also can be called "blimps", which indicates a flexible fabric-type outer skin (or envelope, bladder, etc). However, "blimp" also can imply that the outer skin will be completely collapsible, in ways that allow convenient storage and transport on the ground. Since the aircraft of interest herein must have stiff and strong internal frames (also called skeletons, spines, or other terms), they will not be collapsible. Therefore, "blimp" is not preferred.

The term "dirigibles" derives from a French word for "steerable" or "directable". It applies to any buoyant aircraft with an elongated streamlined shape designed for powered and steerable flight through the air. However, since "dirigible" is a dissonant word that does not sound appealing or translate well, and since the aircraft herein are designed to be blown by the wind while tethered to the ground, rather than flown and steered under their own power, it also is not preferred for use herein.

The term "zeppelin", named after a German engineer who created several major advances in design and construction of such craft, indicates (in modern usage) that multiple gas-tight compartments will be used to hold the hydrogen or helium, so that if one or more compartments are breached, the buoyant gas that remains in any intact compartments will enable a controlled (or at least slower) descent, for greater safety. It has an interesting sound, it is easier to pronounce than dirigible, and it has acquired additional social connotations from the rock band, Led Zeppelin. Accordingly, "zeppelin" is used herein as a generic term for the types of buoyant aircraft that are of interest herein for generating electric power.

To distinguish a "zeppelin" or other "buoyant aircraft" that can be used to generate electric power as disclosed herein, from various types of toys, amusements, prototypes, weather balloons, or other smaller buoyant balloons or devices, the term "buoyant aircraft" as used herein is limited to devices that can exert a vertical lifting force of at least 5 tons, when measured at sea level. As noted below, if a buoyant aircraft can lift five tons vertically, then it can pull a wheeled car that weighs more than 5 tons up a sloping track on the side of a hill or mountain.

There is substantial art in the field of designing and using zeppelins to lift heavy items, with two examples offered by the "Cargolifter" and SKYHOOK™ systems. The Cargolifter system was a giant zeppelin with a set of cables and winches on the bottom, and a set of propeller engines that could move it slowly and horizontally through the air. It was designed for transporting cargo, by means that generally involved using the cable and winch system to lift a large and heavy item off the ground to a low suspended altitude, and then using the propeller engines on the zeppelin to carry the cargo to a desired location, where it would be lowered. That company did not succeed. Hundreds of millions of dollars that had been invested in it disappeared under mysterious circumstances; the company went out of business; and a huge hangar that was built for the zeppelin was converted into an indoor amusement park in Germany. Various pictures and information concerning it remain available, on the Internet.

That failed attempt stimulated renewed interest in using buoyant aircraft to transport cargo, and the SKYHOOK™ system, developed jointly by Boeing and by Skyhook International Inc. of Canada, resulted. This system comprises a zeppelin with a cable and winch system on the bottom, and with four large propeller engines, mounted at the ends of rotatable struts that extend out from the body, positioned at locations comparable to the tires on a car. Illustrations, press releases, and more information can be found by searching the Internet for "skyhook"; however, it is not clear whether any such units have been actually sold, or whether they are in actual use.

Another proposed design worth noting is the "Stratellite" system, which involves a buoyant craft designed to operate as a communications system in the upper stratosphere, at about 80,000 feet, with the goal of providing a relatively low-cost midpoint between orbiting satellites, and very tall antennas. It is shaped like a relatively wide and flat whale, to provide it with a large top surface that is designed to hold photovoltaic materials, to generate solar-powered electrical energy, to run and support the amplifiers, switches, routers, and other electronic systems that will be carried and provided by the zeppelin. Information on that system is available via Wikipedia, Google, and other Internet sources. It does not appear to be in commercial use, and questions arise about whether it is practical, in view of the high winds in the upper atmosphere (which presumably would keep such a system constantly moving), and the vulnerability of polymers in an envelope to damage and degradation by ultraviolet radiation, which is much stronger at such heights than at ground level.

None of those systems are designed or intended for a repeated and frequent cycling operation, in which helium or hydrogen gas is cycled back and forth between high-pressure tanks, and a low-pressure zeppelin envelope. Accordingly, the closest prior art known to the Applicant herein is believed to reside in a prior issued patent, and a prior published application, by the same inventor herein.

Buoyant Zeppelins for Lifting and Launching Large Rockets

The Applicant herein initially became interested in buoyant aircraft (such as blimps, dirigibles, and zeppelins), because of a method that occurred to him for lifting large and heavy rockets high into the atmosphere, and getting them flying forward at moderate speeds, before any rocket fuel must be burned.

One of the crucial factors, for any rocket that is designed to reach an orbital height and speed, is its "orbital efficiency". That number is calculated by dividing the total weight of all hardware and fuel that will reach orbit, by the total weight of the fully-loaded rocket when it was sitting on a launchpad. For conventional rockets launched from the ground, orbital efficiencies reportedly range from about 1% for small orbital rockets, to about 4% for very large Saturn-class rockets. As demonstrated by the huge fireballs that are created and released when a large rocket must lift its entire weight off of a launchpad, from a stationary start, much of that rocket fuel is burned just to get the rocket started, and to lift the fuel. Accordingly, if a system can be devised for lifting a rocket up to 40,000 feet, and getting it flying forward at 500 to 1000 miles per hour before any rocket fuel needs to be burned, then that system would appear to be capable of increasing orbital efficiency levels to somewhere between 20 and 30%, which is roughly a ten-fold increase over the current methods.

Accordingly, the Applicant herein described and patented a "lift and launch" system, for rockets large enough to reach orbit or travel to the moon or Mars. As described and illustrated in U.S. Pat. No. 7,131,613 (Kelly), that system includes a "vertical stack" of four subassemblies, or layers, each of which plays a different role during a rocket launch.

The top layer contains at least one zeppelin, and preferably at least three or more zeppelins held together by strong cables in an "array". The cables will not be attached to the skins of the zeppelins; instead they will be secured to strong internal frame components (which can also be called skeletons, spines, etc.). During a slow vertical ascent, the zeppelins will be fully inflated. After the complete assembly reaches a release altitude, the zeppelins will be partially deflated, in a manner that provides them with streamlined shapes, to allow forward flight at a modest speed in the thin upper atmosphere. Telescoping vertical and horizontal struts inside the zeppelins will be extended and retracted in a coordinated manner, to create a shape that will resemble either: (i) a typical fish, if the vertical struts are extended while the horizontal struts are retracted; or, (ii) a stingray or manta ray, if the horizontal struts are extended and the vertical struts are retracted. Either streamlined shape can reduce drag, and can enable forward flight at a modest speed, even while a large quantity of gas remains inside the zeppelin(s) to help provide "lift" while forward flight is being established.

The second layer of the four-layer system for lifting and launching rockets comprises a "tank barge", which will carry pumps and high-pressure tanks. When the entire system reaches or approaches its maximum altitude, the pumps carried by the tank barge will be switched on, and they will partially deflate the zeppelin(s), in a manner that transfers a portion of the helium or hydrogen into high-pressure tanks carried within the tank barge. For additional lifting power and control, each tank barge presumably also should have at least four rotatable wings, with two wings on each side of the body of the barge, mounted fore and aft. The engines for the "tank barge" wings should be selected for efficiency rather than speed, and presumably should have oversized propellers, comparable to the propellers used on "VTOL" (vertical takeoff and landing) aircraft, such as the Osprey aircraft used by the American military. As with VTOL aircraft, the rotatable wings of a tank barge, in a lift-and-launch system for rockets, will be mounted on horizontal axles that pass sideways (transversely) through the body of the tank barge; this will allow each wing to be rotated, not in an entire circle, but through a 90 degree arc that allows each wing to be either vertical (for generating lift, during ascent), or horizontal (for generating forward thrust, during flight). Accordingly, during ascent, when the wings of a tank barge are rotated to a vertical position, the large propellers driven by the tank barge engines will function in a manner comparable to the rotor blades of a helicopter. Providing at least four such engines, distributed around the periphery of the tank barge, will provide greater balance, stability, and control for the lifting system.

The third "layer" of this system will comprise a "winged ferry" (or lifting ferry, flying ferry, or any other suitable term). It will have either fixed or rotatable wings, and it presumably will have jet engines that can reach much higher speeds than propeller engines. This unit, initially carrying a loaded rocket beneath it, will power up its engines and help establish forward flight, at a low to moderate speed, while remaining suspended beneath the tank barge and the zeppelins.

The fourth and bottom layer of the system will be a rocket, suspended horizontally below (and aligned with the fuselage of) the "winged ferry" plane. Since the rocket will initially operate while still in the atmosphere, it can be provided with wings or fins, and/or with a combination of jet and rocket engines.

The complete four-layer system is designed for a slow, safe, and gentle ascent to an altitude somewhere between 30,000 and 60,000 feet, using the combined lifting forces provided by the buoyant zeppelins, and the tank barge engines acting like helicopter rotors. Once a release altitude has been reached, the bottom two subassemblies (the "winged ferry" and the rocket) will be separated and released from the top two subassemblies (the zeppelins and tank barge). The ferry and rocket will begin flying forward on a downward-sloping glide path until they reach high speed, unhindered by the zeppelins or tank barge. Just before the rocket is released, its power and thrust will be increased, and the wings, flaps, and fins of those two units, still flying together, will be used to lift their noses upward to a steep slope, to provide a near-optimal launch direction, for the rocket.

Meanwhile, the tank barge will continue to deflate the zeppelins, and those two units, still coupled to each other and flying together, will descend back to a landing spot, using the engines and wings of the tank barge for power and steering.

Accordingly, by using that type of lift-and-launch system, a large and heavy rocket can be lifted to an altitude of greater than 30,000 feet, and can reach forward flight at a speed of hundreds or even thousands of miles per hour, before a single drop of rocket fuel must be burned.

In terms of prior art, this patent discloses a system of zeppelins that are tethered to a tank barge carrying pumps and high-pressure tanks, specifically for the purpose of enabling a repeating cycle of ascent and descent by one or more zeppelins, for lifting a heavy weight (i.e., a fully-loaded rocket) to a desired altitude, and for then returning the zeppelin system to the ground so that it can be prepared for the next launch. It also states that the pumps/compressors and high-pressure tanks can be carried directly by the zeppelin, if desired, in a way that can eliminate one of the four layers of the complete lift-and-launch system; however, that design would not be optimal, and it would eliminate and lose a set of useful components that can help the system make a high-altitude transition from slow ascent, to high-speed flight.

Lifting Ferries for Cargo or Passenger Planes

After working on the rocket system described above, the Applicant herein realized how a similar system could be modified for use in lifting conventional airplanes (such as passenger jets) up to a takeoff height or even cruising altitude, before releasing them. This type of lifting system can use a "lifting ferry" that comprises two levels: (i) an array of zeppelins, filled with hydrogen or helium; and, (ii) a "lifting ferry" with pumps and high-pressure tanks, and with wings that can be rotated between a vertical position (for ascent) and a horizontal position (for forward flight). When those two lifting assemblies, acting together, have lifted a cargo or passenger plane to a suitable altitude (which in most cases will range between 10,000 and 30,000 feet), the engines of the plane will be started and/or powered up, while the zeppelins are partially deflated to convert them into a streamlined shape, and the wings of the lifting ferry are rotated partially forward, to establish a modest forward flight speed.

When the combination of forward flight speed and plane engine thrust have reached a safe level, the entire system will be angled downward, into a "nose down" position that establishes a "glide path" for safe release of the airplane. The plane will be released, and it will rapidly increase its flight speed, allowing it to level off and fly normally to its destination. The "lifting ferry" will descend back to earth, with the zeppelin(s) still coupled to the rotatable-wing aircraft, to be prepared for another ascent with a different fixed-wing airplane.

That system is believed to be capable of substantially reducing the quantity of fuel that must be used by fixed-wing aircraft to take off from a runway. It is described in more detail in copending patent application Ser. No. 11/557,378, filed Nov. 7, 2006 and published as 2007/0187547. The contents of that application are incorporated herein by reference, as though fully set forth herein.

Coupling of Two Different Types of Power Cycles

While considering and analyzing various design requirements, operating principles, and efficiency advantages for the type of "lifting ferry" that can lift a fixed-wing airplane up to a release height, the Applicant realized that a curious and possibly paradoxical effect might arise, when two different types of systems are compared against each other. One type of system comprises a buoyant zeppelin, combined with a "lifting ferry" with rotatable wings and oversized propellers. The other type of system comprises a "lifting ferry" only, with rotatable wings and oversized propellers, but without a zeppelin.

A comparison between those two different types of "lifting ferry" systems suggests that inclusion of a buoyant aircraft that uses a repeating cycle (i.e., gas expansion and zeppelin inflation for each ascent stage, followed by gas compression and zeppelin deflation for each descent stage) may be able to provide a substantial improvement in the operating efficiency of such a lifting system. Stated in other words, it appears that the total amount of aircraft fuel that must be burned, on a "per passenger-mile" basis, can be reduced, by including a buoyant aircraft (such as a zeppelin filled with hydrogen or helium, and provided with pumps and tanks that can partially deflate the zeppelin and convert it into a streamlined shape with reduced buoyancy, after it reaches a desired altitude) in the lifting ferry.

The extent of the increased improved lifting efficiency that can be gained, by incorporating a buoyant craft such as a zeppelin in a lifting ferry, cannot be reliably estimated or predicted by the Applicant, who does not have the computer-modeling resources that are available to aircraft companies and engineering colleges. However, even without computer modeling, an important factor came into focus, which can be described as follows.

When a gas is run through a repeating cycle of compression and expansion, the result (in terms of the net energy input that is required, to keep the cycle running) is believed to be similar to various other types of repeating cycles, such as: (1) compressing a metal spring, which will require energy input, leading to a state of higher "stored energy"; then, (2) allowing the spring to expand again, which releases the "stored energy". If the stored energy that is released by the spring, during expansion, can be "grabbed" (or harvested, extracted, etc.), and either stored briefly, or converted into some alternate type of energy which will then "swing back" again as the cycle continues, then that type of cycle can continue to run, over and over again, with only low net energy input requirements.

Stated in other words, it requires substantial energy input to reach a complete first compression of a spring, which is necessary to get the cycle started. However, assuming that the spring was made from a well-chosen alloy, after a first peak of high "stored energy" has been reached, then from that moment on, the spring can continue to oscillate back and forth in a repeating cycle, without consuming a large amount of energy, as it merely repeats the cycle.

Using another analogy, if a large and heavy pendulum has received enough energy input to get it swinging through an arc, then it may continue swinging for hours, with no additional energy, power, or work input. For purpose of analysis, assume that a new cycle begins each time the pendulum reaches a point of maximum height, at the farthest "reach" of its arc. At that instant, the pendulum comes to a pause; it is stationary, as it reverses direction. At that instant, there is zero "kinetic" energy, and zero momentum, and the energy in the pendulum can be referred to as stored energy (or potential energy, or similar terms), which is manifested in the fact that the pendulum has traveled to the highest point (or altitude, elevation, etc.) in its arc. Then, as the pendulum swings back down through its arc, its stored or potential energy is converted into kinetic energy (i.e., speed and momentum), until the pendulum passes through its low point, at the center of its arc, where it reaches its maximum speed, momentum, and kinetic energy. As soon as the pendulum has passed that lowest point, gravity begins working against the kinetic energy, in a manner that slows down the pendulum, until it comes to a complete and total stop, at the "far end" of its arc. That "half cycle" is then repeated, as the pendulum swings back in the opposite direction, arriving at a stopping point that is usually only a very tiny or even microscopic fraction of an inch lower than its highest point of elevation during the previous cycle.

The point worth noting is that once a large and heavy pendulum is pushed up to a relatively high point and then released, so that it will begin swinging, it can keep swinging for a long time, through hundreds or even thousands of arcs (depending on its length, weight, etc.), with absolutely zero requirements for any additional input of energy, power, or work. In mechanical systems, that usually is the nature of a repeating or reciprocating cycle, if a system is able to convert energy levels back and forth between two different states, without substantial losses of energy during each conversion.

A similar phenomenon applies to "hybrid" cars. In a typical non-hybrid car, the brakes do nothing to harvest any useful work or power. Instead, brakes stop a car by using friction, which heats up the brake pads and wheel rotors; those brake pads and rotors then dissipate that useless heat, to the atmosphere. When a stopped car begins moving again, it must burn additional gasoline, to provide the power that accelerates the car back up to driving speed.

In contrast, "hybrid" cars get better gas mileage because they convert the kinetic energy, of a moving car, into stored electrical energy, each time the brakes are applied and the car slows down or comes to a stop. Instead of simply pressing brake pads against wheel rotors, the braking system of a hybrid car engages an electric power generator. As known to any engineer, a generator will "push back" when a wire coil is mechanically forced to rotate, inside a magnetic field. The generator in a hybrid car that is slowing down converts kinetic energy into electric power, which is sent to a storage battery. Then, the electric power stored in the batteries is used as a power supply, to accelerate the car up to driving speed, when the driver pushes the "gas pedal" again. Stated in other words, hybrid cars are more fuel-efficient because they cycle energy back and forth between two different useful energy states, rather than wasting energy by heating brake pads and wheel rotors, each time a car must stop or slow down.

In a directly analogous manner, if a repeating cycle of gas compression (into high-pressure tanks carried by a "tank barge") and expansion (into the low-pressure envelopes of floating zeppelins) is carried out by a pumping system that is designed to capture and convert energy back and forth between two different useful states, rather than having to "start the work all over again" each time the "compression leg" of a cycle begins, then that type of pumping system should be able to continue for numerous cycles, with only relatively low requirements for additional input of power, energy, and work, to keep the cycle going.

That operating principle—it does not require large inputs of energy and work to keep a repetitive cycle going, if the cycle is carried out by efficient and well-designed machinery that converts energy back and forth between two different useful states—must now be directly compared and contrasted against a very different operating principle, which can be stated as follows.

If a large zeppelin is filled with helium or hydrogen gas, then the buoyant force created by that zeppelin can lift a heavy weight, to a very high elevation. Then, once the heavy weight has reached its highest elevation (or altitude, or similar terms), it can generate a large amount of usable electric power, as it descends back down to the lowest elevation in its reciprocating pathway.

As an example that is described in more detail below, consider a heavy weight in the form of a railroad car (or series of cars, in a train) that weighs dozens or even hundreds of tons, which travels up and down a sloping railroad track on the side of a mountain that is thousands of feet high. Assume that each railroad car weighs 50 tons (this is a feasible weight, since a large zeppelin can lift about 300 to 400 tons) and carries large, heavy, and powerful generators and batteries. As a train with several 50-ton cars rolls down that sloping railroad track, the turning of the wheels on the train cars can be used to rotate the driveshafts of the generators carried by the cars. By using rotating wire coils mounted inside powerful magnetic fields, mechanical power is converted into electric power that emerges from the generators. That electrical power can be temporarily stored in the heavy bank of batteries carried by the car. When the car reaches the bottom of its track, that electric power is transferred to a stationary power grid.

Accordingly, if those two different types of reciprocating cycles are coupled together, a potential paradox would appear to arise. One cycle involves helium or hydrogen gas, cycling back and forth between high-pressure tanks, and low-pressure zeppelins. As described above, a presumption arises that this type of reciprocating compression-and-expansion cycle likely can be performed without requiring huge inputs of additional energy from the outside, so long as the gas-handling equipment is properly designed to "harvest" and store the energy that is released each time high-pressure gas leaves the tanks. The other cycle involves lifting a large and very heavy weight to a high elevation, and then efficiently extracting the energy that is generated when that large and heavy weight rolls down a sloping track, to a point which is thousands of feet lower than the elevation of the highest point of the railway track.

The paradox that would appear to be created, when those two different types of cycles are coupled together, centers around the phrase, "perpetual motion machine". As any competent scientist or engineer knows, perpetual motion machines cannot exist, because they would violate a basic law of physics which states that entropy must increase, in any system, over time. That law of physics is known as the second law of thermodynamics, and it is described in numerous sources that can be easily located at no cost. For example, an explanation at a layman's level is available in Wikipedia, and online materials, posted by professors for college-level courses in physics or thermodynamics, cover the subject at more advanced levels.

However, any observation that "perpetual motion machines" cannot exist must be approached carefully, and a crucial step in any such analysis is to define and understand what the relevant "system" actually is.

As a simple example, if someone couples photovoltaic cells to a battery and a motor, and places that system in a location where the sun shines on most days, then for all practical purposes, and under any realistic understanding and scenario, that simple, basic, easily-created system is indeed a "perpetual motion machine". By using sunlight as its energy source, it can continue running until the motor wears out, or until the sun dies.

When faced with that scenario, a scientist will point out in reply, "Yes, but by bringing sunlight into the system, you make the sun a part of your system. And the sun will not last forever. Its entropy is increasing. Even though it will last for billions of years, it still is not perpetual."

That is indeed true. The sun will not last forever; it has a projected lifespan of roughly 5 billion more years. However, on a practical and reasonable level, there is no good reason not to regard "all of planet earth" as a reasonably complete and self-contained system, and there is no compelling reason to not regard the entire future of this planet as a relevant, practical, and appropriate operating "lifetime" for a machine.

Under those types of practical and reasonable terms, it becomes simple and easy to create something that can be classified and dismissed as a "perpetual motion machine". It can be accomplished merely by using sunlight to drive a photovoltaic cell, with no other energy input that "costs" anything in any way. Or, it can be done by using geothermal energy, or wind power, or ocean waves. None of those "external energy inputs" are limited by anything except the lifespan of the sun and the earth. For practical purposes, when plain English is used, a wind turbine is a "perpetual motion machine". It can continue generating and releasing power for decades, without ever needing any additional energy input that humans can provide. It can generate and emit (the terms "capture and convert" might be more accurate) much more power and energy than was used to build it.

Accordingly, the levels of practical insight and understanding can improve if people use terms such as "net power output", where the word "net" has the same meaning as in "net income" or "net profit", rather than getting distracted by "perpetual motion machine" definitions and conundrums.

Since "net power output" will be crucial in determining whether and to what extent the invention disclosed herein is commercialized, two types of well-known power generation systems appear to offer the most relevant and useful benchmarks for evaluating and measuring the invention disclosed herein.

One line of technology involves large wind turbines, and the large units made by a company such as General Electric (GE) offer a good system for comparative analyses. Those units emerged from an extensive process of research, development, computer modeling, and optimization, and technical information on them is readily available from websites such as www.ge-energy.com/wind.

Large GE wind turbines are made in 1.5, 2.5, and 3.6 megawatt (mW) sizes. A 1.5 mW unit (which comes in a smaller 1.5sle model and a larger 1.5xle model) has a "hub height" that ranges from 65 to 80 meters (213 to 263 feet) high, and a rotor length of either 38.5 meters (126 feet) for the 1.5sle model, or 41.25 meters (135 feet) for the 1.5xle model. Either model has "variable pitch" rotors (i.e., the angle or slope of each rotor blade can be adjusted, depending on the prevailing wind speed at any moment). To generate power, the average wind speed (averaged over 10 minute intervals) must be at least 3.5 meters/second (about 8 miles per hour, or mph); that minimum speed is called the "cut-in" speed. When a "cut-out" wind speed is reached, the unit must stop generating power, to prevent damage to the unit; this upper wind speed limit is 25 meters/second (about 56 mph) for the smaller 1.5sle unit, and 20 meters/second (about 45 mph) for the larger 1.5xle unit.

For the substantially larger 3.6 megawatt units, the hub height is "site dependent" and usually ranges from about 80 to 120 meters, or roughly double the blade length of 52 meters. The minimum "cut-in" wind speed is 3.5 meters/second (about 8 mph), while the maximum "cut-out" wind speed is 27 meters/second (about 60 mph).

To spread out the expenses of coupling wind turbines to an electric power grid, multiple units usually are clustered together in banks or arrays, typically having from a dozen up to a hundred or more turbines. Because high "cut-out" speeds are important, preferred areas for "wind farms" generally require moderate and predictable wind speeds, rather than high wind speeds; suitable locations tend to be near coastlines, in valleys surrounded by hills rather than mountains, on hilltops surrounded by plains, etc. An entire "wind farm" requires large up-front investments, ranging from tens to hundreds of millions of dollars, to pay for manufacture and assembly of the turbines, and to connect the wind farm to a high-voltage power grid that supplies electricity to cities and towns. However, after those steps are complete, wind turbines can extract energy from an essentially free and unlimited resource, over an operating life that will last for decades.

The second main type of comparative or benchmark technology that merits attention involves "pumped storage hydroelectric" systems. More than 100 such units operate around the world, and information on them can be obtained by searching for "pumped storage hydroelectric" in Internet sources such as Wikipedia or Google.

These units are designed and built to help cities and towns handle an important aspect of power generation and consumption. In any city or town, the demand for electric power depends heavily on a day/night cycle. In nearly any locale, the demand and need for electric power is much greater during daytime and evening hours, starting at about 6 am (local time), and lasting until about 11 pm at night, than during the overnight hours. After 11 pm, the demand for electric power drops to much lower levels until 6 am, when demand begins to increase again.

To help cities and towns handle the day/night fluctuations in demand, "pumped storage hydroelectric" systems pump large quantities of water up to elevated tanks or reservoirs (usually sitting on hilltops), during the overnight hours of low demand, between 11 pm and 6 am. Then, to meet peak power demands during the day, the flow direction is reversed, and the water descends back down through large generators in pipes or tunnels. As in hydroelectric dams, those turbines convert the flow of pressurized water, into electric power.

Pumped storage hydroelectric units never can, and never will, reach a level that can be described as "net power out". They will always and inevitably consume more electric power, at night, than they generate during the day. These "losses" mainly involve friction-type heating of the water, when it is pumped up a hill, and when it runs down through a pipe and turbine. Water is very efficient in soaking up and absorbing heat energy, thereby creating useless energy "sinks" that reduce the efficiency of any power-handling system that involves water. Nevertheless, because of the day/night demand cycle, pumped storage hydroelectric units are valuable and even essential to the ongoing operations of quite a few power systems, and these units offer good "benchmarks" that can be used, on a fair and practical basis, to evaluate the operating efficiencies and economic benefits of the power-generating units described herein. Because the units described herein will not suffer from any losses related to the useless heating of water, it is believed that these units can outperform pumped storage hydroelectric units, probably by substantial margins. That is sufficient to establish patentable utility for the systems described herein, regardless of whether these units operate at a "net power out" level.

Accordingly, one object of this invention is to disclose machinery and methods for generating electric power, using buoyant aircraft (with helium or hydrogen) to lift large and heavy traveling generator systems (or heavy cars coupled to generators, by cables or similar means) to relatively tall heights, thereby enabling the heavy "cars" to generate electric power as they descend down a rail-type pathway, during the descent leg of each power cycle.

Another object of this invention is to disclose and create a system for generating electric power, using buoyant aircraft that also incorporate wings, sails, propellers, or other devices, to lift heavy generator systems to relatively tall heights, thereby enabling those heavy units to generate electric power as they descend down a rail-type pathway.

A third object of this invention is to disclose a system for using fabric or polymer sails that can generate very strong pulling forces, to lift large and heavy generator units to the top of a rail-type track such as on the side or a large hill or mountain, thereby enabling those heavy units to generate electric power as they descend.

Another object of this invention is to disclose a system that couples two different cyclic processes to each other, where: (i) one cyclic process uses compression and expansion of helium or hydrogen gas; and, (ii) a second cyclic process involves lifting a large and heavy unit to the top of a rail track, and then using that large and heavy unit to generate electric power as it descends back to the lowest point on the track.

Yet another object of this invention is to disclose machinery and methods for generating electric power which have various operating advantages compared to either wind turbines, or pumped storage hydroelectric units.

These and other objects of the invention will become more apparent through the following summary, drawings, and detailed description.

SUMMARY OF THE INVENTION

Systems and devices are disclosed for using buoyant aircraft (such as a large zeppelin filled with helium or hydrogen) and/or spinnaker-type sails to lift a heavy railcar or train of cars to an elevated height, on a vertical or sloping track that can be supported by a set of reinforced towers, a sloping track on a hill or mountain, or an elevator-type shaft in a tall building. When the heavy car or train reaches the top of the track, it is released, and a gearing system will drive the rotation of generator shafts, as the car or train descends. If the generators are carried on the traveling cars, their electric power can be sent to batteries in the railcar, or to conductive rails installed along the track. Alternately, if the car carries an inert weight such as sand, a cable system can be used to drive stationary generators as the car descends.

The zeppelin will be inflated and deflated in a repeating cycle, using efficient equipment to recapture as much energy as possible during each expansion stage of the gas-handling cycle. Reaching the first peak of "stored energy", by pumping hydrogen or helium into high-pressure tanks, will require a large power input; however, when the gas is later allowed to leave the tanks and enter an unpressurized balloon, much of that energy can be recovered, in a manner comparable to cyclic compression and decompression of a spring. Accordingly, it is believed that this type of closed gas-handling cycle, if designed and run properly, can run for numerous cycles without requiring large amounts of additional energy input.

In addition to using gas-filled buoyant aircraft, this system also uses spinnaker-type sails to generate large wind-driven forces that can help lift a heavy car to the top of its rail track, during the ascent stage of each cycle. Such sails can generate substantially greater force, power, and work than wind turbines, because of two major factors. First, the blades of a wind turbine occupy only a small fraction (roughly 5% or less) of the "swept area" that is traversed by the rotor blades, while "unused" wind simply blows through the huge majority of the swept area, without transferring any power to a mechanical system. Second, the sloping surfaces of wind turbine blades must convert wind power that is moving in one direction, into mechanical power that is moving perpendicular to the direction of the wind. That required "direction change" further reduces the efficiency of wind turbines. Accordingly, both of those factors greatly reduce the amount of actual power generation by wind turbines, and both of those factors can be avoided and eliminated, if a spinnaker sail is coupled to a cable and pulley system, and used to repeatedly pull a massive and heavy car to the highest point on a sloping or vertical track.

BRIEF DESCRIPTION OF THE DRAWINGS

FIG. 1 is a side view of a heavy "gen/batt" car that carries generators and a bank of batteries, riding on a track in a vertical tower system. A gear system causes the wheels of the car unit to drive electric generators, as the unit rolls down its track. The generators convert mechanical power into electric power, as the unit descends. The electric power is stored in a bank of batteries during descent, and is transferred from the batteries to an electric power grid on the ground, each time the gen/batt car completes its descent, in each power cycle.

FIG. 2 depicts a helium- or hydrogen-filled zeppelin lifting a gen/batt car toward the top of a vertical tower assembly. The tower assembly is aligned with a vertical tunnel in the ground, to provide a longer "power stroke".

FIG. 3 depicts a zeppelin with a relatively wide body shape, operating in a "nose up" orientation (or pitch, angle, etc). This causes wind force, pressing against the sloping underside of the zeppelin, to generate greater lifting force during the ascent stage (or leg) of a power-generating cycle.

FIG. 4 depicts a "wide body" zeppelin operating in a "nose down" angle during descent, to reduce the volume of helium or hydrogen that must be evacuated from the zeppelin to enable it to descend.

FIG. 7 is a flow chart indicating the steps that can be used to operate a cyclic and reciprocating system for generating electric power, using a buoyant zeppelin and a spinnaker sail to lift a heavy gen/batt car to the top of a rail track. After the gen/batt car reaches its highest point, it is released from the lifting system, so that it can generate electric power as it descends down the track. During the descent leg of the operating cycle, the sail is partially released, the zeppelin is partially deflated, and the lifting unit is returned to its starting point, so that another power-generating cycle can be commenced.

DETAILED DESCRIPTION

Figure 5:
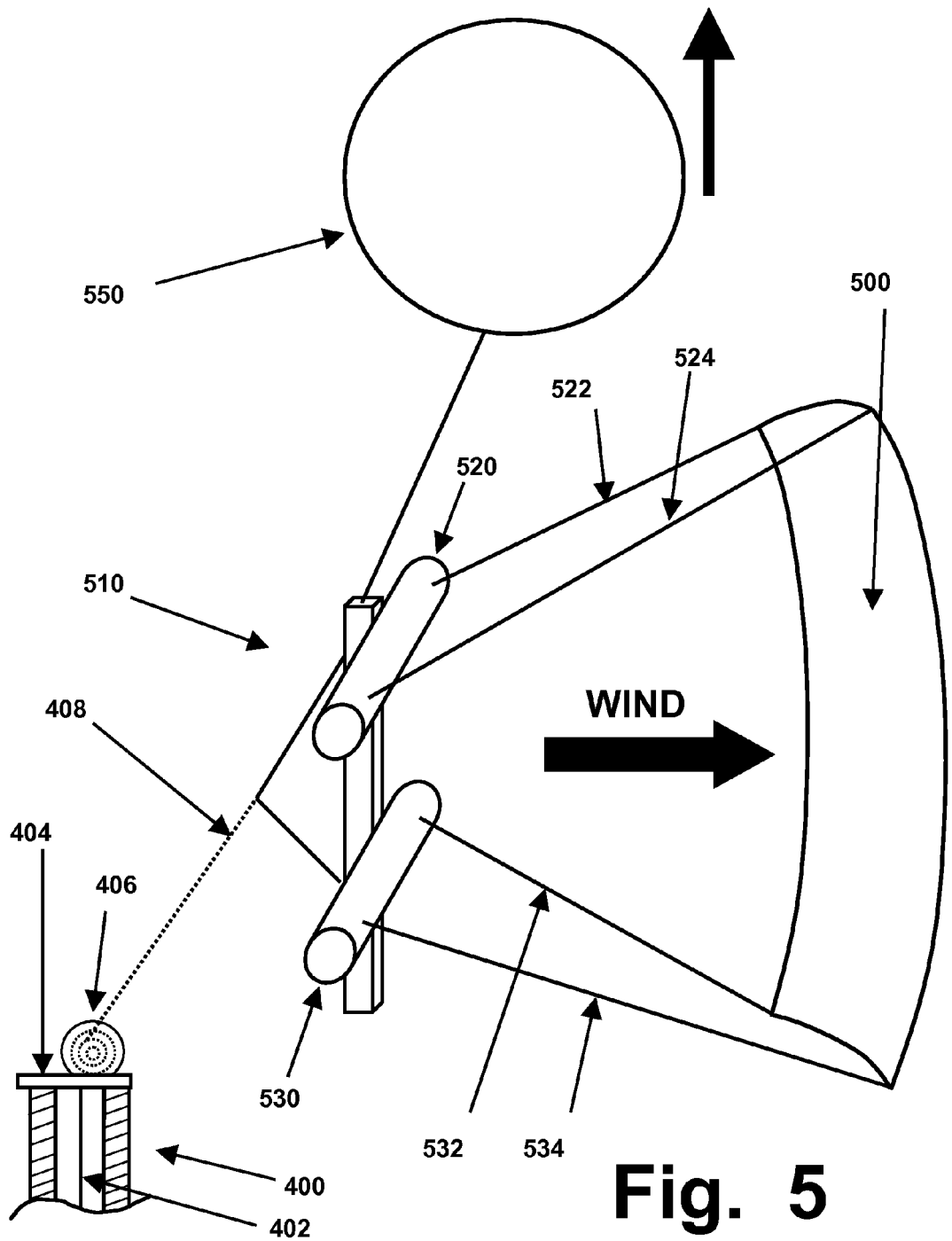
FIG. 5 depicts a spinnaker-type sail tethered to a cable-handling unit with upper and lower spreader bars. The cable-handling unit is held aloft by a moderate-sized balloon, and is coupled to a gearing system mounted on top of a short tower that can withstand large horizontal forces, such as on top of a hill, mountain, or building.

As briefly summarized above, either and preferably both of two types of lifting and pulling devices (a helium- or hydrogen-filled zeppelin, and a spinnaker-type sail) are used to lift a heavy traveling unit (which can also be called a reciprocating or cycling weight, car, unit, or similar terms) to an elevated height, such as on a vertical or sloping track installed in a tower assembly, in or alongside a tall building, or on a slope of a large hill or mountain. After the heavy car reaches its highest point of ascent, it is released from the pulling and lifting device(s), and it descends down the track, using its weight and motion to generate electric power as it descends.

In one preferred embodiment, the heavy car can contain one or more large generators, and will use metallic wheels, or other brushes or contacts, to continuously transfer electric current from the generator(s) into the rail system, as the heavy car descends. In a second preferred embodiment, the heavy car can also contain a bank of batteries to temporarily store electric power from the generators, until the car reaches the bottom of the track, or until power is intermittently transferred to rail components positioned at spaced intervals along the track. In a third preferred embodiment, the heavy car can be filled with an inert weight (such as water, sand, metal bricks or ingots, high-density concrete or bricks, etc.); if this design is used, the car must be coupled (via a cable, chain, or similar mechanism) to one or more stationary generators positioned near the track.

To render the system complete and capable of generating electric power, it must also contain a "tensile subassembly" which can be coupled to the heavy car, and which can exert sufficient pulling and lifting force on the car (or train) to pull the car (or train) up to the top of the track. This subassembly must also allow detachment and release of the pulling force from the car, each time the car reaches its highest point on the track, to allow the car to descend down the track in a manner that generates electric power. This tensile subassembly can comprise, for example, one or more segments of cable or chain; one or more pulleys, gear systems, or other directional or transfer devices that are engaged by a cable or chain; and hitching mechanisms at both ends of the tensile subassembly. The hitching mechanism at the lower end of the subassembly will allow it to be coupled to the car, each time the car has descended to its lowest point and is ready for another ascent cycle, and then uncoupled from the car, each time the car has reached its highest point on the track and is ready to generate power as it descends. The hitching mechanism at the upper end of the tensile subassembly will allow it to be uncoupled from the zeppelin and/or sail, either on an as-needed basis (such as for maintenance, or when a storm is approaching), or at the end of each ascent, if a fleet of two or more zeppelin and/or sail units will be swapped out, to provide more time to enable each zeppelin and/or sail unit to be "brought down" and readied for another power cycle.

Each of those subassemblies is discussed below, followed by a discussion of a typical operating cycle.

Heavy Cars, with Optional Generators and Batteries

A schematic depiction of a traveling generator unit 100, which is generating electricity as it travels downward between two vertical tower components 180 and 190, is provided in FIG. 1. The tower components 180 and 190 are described in more detail below, and are illustrated in FIG. 2.

Generator unit 100 is shown as carrying a set of batteries 150. This is intended mainly to depict the electrical nature of the generators. In an actual system designed to generate as much electric power as possible, using power and work to repeatedly lift and lower a set of batteries most likely would not be an optimal use of this type of system, and better results (i.e., greater power output, from a heavy car having a fixed weight) likely can be obtained by either of two alternate designs.

In one preferred design, a traveling car can be loaded (and weighted) with nothing but generators. If this design is used, the system must be designed to continuously transfer electric power and current, from the generator(s) that ride on the car, into the rail system, using contact devices such as the systems developed for electric mass-transit systems. If the system is outdoors, any current-conducting elements must be shielded from rain, animals, people, etc.

In an alternate preferred design, a heavy car can be loaded with an essentially low-cost inert weight, such as sand, rocks, scrap metal, or concrete blocks, any of which can be supplemented by water, for additional weight. This type of inert car can be coupled, via cables, chains, etc., to one or more stationary generators installed near the track; alternately, cars with inert weight can be coupled to generator cars, in a train assembly having multiple cars.

In general, cars that carry generators likely will be better suited for systems that operate on long tracks, such as tracks on the side of a large hill or mountain, while inert cars coupled by tensile means to stationary generators likely will be better suited for systems that use shorter tracks, such as in an elevator-type shaft inside a tall building.

Despite that design recommendation, the description below addresses travelling "gen/batt" units that carry generators and batteries, to help explain this system and invention in a logical step-by-step manner.

For reasons described below, a free-standing tower assembly (as illustrated in FIGS. 1 and 2) is likely to be more expensive, and less sturdy, stable, and reliable, than a railroad-type track laid on a sloping side of a large hill or mountain, as illustrated in FIG. 5. However, to understand the principles and components involved in this invention, it can be easier and more logical to think in terms of lifting a heavy unit up a vertical track, and then using the heavy unit to generate electricity as it descends back down the vertical track.

It also is possible to install vertical tracks inside (or otherwise affixed to) tall buildings. For example, if a tall office or condominium tower has not been completed, or is only partially occupied, it may have one or more elevator shafts or comparable vertical pathways that could be converted to a power-generating track for use as described herein. Alternately, if a tall building is being planned and designed by architects, it can be designed to include and enclose one or more power-generating shafts that extend for all or most of the height of the building.

Options also arise for installing vertical tracks on one or more sides of an already-existing tall building. If that approach is used, it would be prudent to mount "paired" units that would operate in synchronized cycles on opposing sides of a building, to create properly-balanced vertical and horizontal forces and stresses. Systems that use balanced weights can minimize forces called "bending moments", which can create impose unwanted forces and stresses on a building that would cause creaking and other unwanted noise, as unbalanced units travel up and down, and which also likely would cause cracking of drywall, stresses on large windows, and other problems.

Any massive and heavy traveling unit (which also can be called a heavy car, weighted car, generator car, cycling weight, or any similar terms) that reciprocates on a track as disclosed herein will generally use and require a "chassis". That term is not always used consistently or precisely; for purposes herein, it is used in an inclusive, tolerant, and flexible manner. In general, a chassis is a moving frame or comparable structural support that can be coupled to, and that will rest upon and travel with, wheels, rails, or similar components of a moving vehicle. In strict terms, a chassis excludes the axles and wheels of a car; however, in common use, the chassis often includes the wheels and axles, any hitching components, and any other components that sit beneath (or that otherwise help support or add utility to) a structure that provides a movable foundation and support for anything that may be affixed to, or loaded on top of, the chassis. For example, if a boxcar structure is welded or bolted to the chassis of a railcar, the floor of the boxcar might be regarded either as part of the chassis, or as part of a detachable freight compartment.

Comparisons of railroads against trucks have shown that wheel-rail combinations made of steel or other hard metals are substantially more efficient than interfaces that involve rubber wheels or other flexible materials, since rubber wheels tend to generate waste heat when they are flexed repeatedly by mechanical forces. Therefore, for maximal power-generating efficiency, the types of cars of interest herein preferably should be designed to ride on wheels made of steel or other hard metallic alloy, which includes stainless steel or any other metal alloy. Conventional railroad wheels (and, indeed, used flatbed cars and boxcars) are suitable and readily available, and their wheels have rims that enable them to engage and be constrained by rails, which also are made of steel or similar hard metal.

To obtain a sense of the sizes and weights that will be involved, one can think in terms of a boxcar or flatbed car, in a conventional train, or a large passenger or freight elevator that has been given extra reinforcement. Flatbed cars, tank cars, and boxcars from conventional trains can be purchased in used but working or repairable form, and they offer relatively low-cost "rolling stock" that can be directly adapted for use herein. Furthermore, since train cars are designed to be coupled together to form a train with any desired length, they are ideally suited for enabling a power-generating company to adjust the length and weight of a train of cars, at the beginning of any ascent cycle, to adjust for factors such as variable wind speed, and time of day or night. With regard to elevators designed to travel vertically, most conventional "elevator cars" would need additional reinforcement, to make them strong enough for use herein.

In terms of weight, it was reported in the 1980's that very large zeppelins made with thin polymeric skins could vertically lift up to about 400 tons of weight. Accordingly, weighted cars that weigh anywhere in a range of about 10 to more than 50 tons each are feasible and appropriate for use in the systems described herein.

In addition, if a track is sloping rather than vertical (such as a track installed on the side of a hill or mountain), the pulling force that will be required to pull a heavy car or train up the track will be less than the weight of the car or train, and will depend on the slope of the track, in a manner that depends on mathematical sine values. Based on sine values, a vertical lifting force of 100 tons can pull a car or train weighing up to about 300 tons, up a track with a 20° slope (where 0° is horizontal and 90° is vertical). If the slope is 30°, a vertical force of 100 tons can pull a car or train weighing up to 200 tons.

These types of force-weight-slope combinations will only establish minimal "slow crawl" speeds; greater lifting forces and/or lighter train weights will enable faster travel, thereby allowing a larger number of power cycles to be completed each day. Nevertheless, if a single zeppelin can exert a vertical lifting force greater than 300 tons, even after the weight of a frame, cables, and other zeppelin components are from its lifting capacity, this can provide a ballpark sense of the power levels that can be generated by these types of systems. Furthermore, a 300-ton vertical lifting force from a zeppelin assumes no wind assistance of any sort, but as described below, the use of wide-body zeppelins with pitch control, attached rotatable wings or fins for greater lift, and spinnaker sails, are all designed to increase the pulling and lifting forces that can be generated by these types of systems, leading to faster ascent times for very heavy trains, and greater net power output from a working system.

Returning to the components illustrated in FIG. 1, each of tower components 180 or 190 supports a fixed and nonmoving linear gear 182 or 192. These types of "linear gears" are also called "rack" gears, when referred to as part of a "rack and pinion" gearing system. Linear gears 182 and 192 will engage "pinion" gears 122 and 132 (also called star gears, radial gears, round gears, cog gears, or similar terms), in a way that forces rotation of the pinion gears 122 and 132, as the gen/batt unit 100 descends.

Pinion gears 122 and 132 will be coupled (either directly, such as by welding, or via a gear system, chain, belt, or similar indirect coupling) to the driveshafts 124 and 134 of generators 120 and 130. Accordingly, as gen/batt unit 100 descends down a "geared railway" provided by the tower, the weight and the downward travel of the gen/batt unit 100 will drive the rotation of driveshafts 124 and 134. That driveshaft rotation forces the rotation of large wire coils, mounted within powerful magnetic fields, in generators 120 and 130. These types of generators, which convert mechanical force into electric power, are conventional and well-known, and are used in hydroelectric dams, fuel-burning electric power plants, wind turbines, etc.

When the coils of a generator are forced to rotate inside a magnetic field, they will "push back" against the mechanical force that is driving their rotation. That type of resistive or "pushback" force can be used to control and limit the descent speed of a gen/batt unit 100, to limit it to a safe speed. That speed can be fairly rapid until the gen/batt unit gets close to the ground. When it approaches its stopping point (which can be referred to as a resting position, lowest altitude or elevation, base, nadir, or similar terms), any of several types of braking mechanisms can be used to reduce the speed of the gen/batt unit, to slow it down for a soft landing that does not cause any jarring, or any wear that would manifest as damage over a span of years or decades of use.

Preferably, any such braking mechanism should be designed to convert the kinetic energy of a heavy moving unit into usable power, rather than to merely heat up a set of brake pads or a fluid in a shock absorber. These types of energy-efficient braking systems can use, for example: (i) an additional set of generators, which will be geared to engage and begin rotation at a controlled moment, as the gen/batt unit approaches a "slowdown" zone; and/or, (ii) a "braking" setting that is provided by the main generators, using sensors, circuits, and microprocessors designed for that purpose.

Alternately or additionally, a heavy flywheel can be driven from a stationary mode, into a high-speed rotation mode, by an energy-efficient braking system that converts the kinetic energy of the gen/batt unit, into kinetic energy held within a spinning flywheel. The flywheel's rotational energy can then be transferred to another device, and converted into usable electric power, after the gen/batt unit has come to a stop. These types of energy-efficient braking systems are used in some types of large buses and other heavy vehicles, and they effectively transfer kinetic energy back and forth between the vehicle and the flywheel, each time the vehicle stops and then starts again.

As gen/batt unit 100 descends, and as generators 120 and 130 generate electric power, that power is sent to a large and heavy bank of batteries 150, which are carried by gen/batt unit 100, as shown in FIG. 2. This power charges the batteries 150, as unit 100 descends. After unit 100 reaches its lowest point (which may be at ground level, at the bottom of a vertical tunnel, etc.), the electric power stored in batteries 150 is transferred to an electric power grid, on the ground.

As used herein, the term "battery" includes any type of unit that stores electric power within the boundaries of a fixed and relatively compact device, in a manner that enables the power to be released from the device (in the form of an electric current driven by voltage) when the device is coupled to an electric circuit. This includes batteries that use solidified chemical materials to store electrical energy (as exemplified by conventional flashlight-type batteries, and by the banks of larger and heavier batteries used to store power in "hybrid" cars); batteries that use liquids (as exemplified by the 12-volt batteries used for conventional automobile ignitions); devices that use combinations of liquids and membranes (often referred to as "fuel cells") to generate electric power; and devices that used rotational energy of a rapidly spinning cylindrical weight to store power (as exemplified by flywheels and homopolar generators).

It also should be noted that a traveling gen/batt system as disclosed herein does not need to travel all the way to its lowest "resting position" at or near the lowest elevation on a rail track before it discharges and released stored electric power; for example, if a rail track has an elevational drop of hundreds or even thousands of feet, a gen/batt unit can carry a set of "contacts" (which also can be called brushes, electrodes, or various other terms) that will contact one or more sets of "discharge strips" that are mounted along the track system.

Various types of automated controls can be used to ensure that the gen/batt unit remains horizontal, level, and stable at all times during its descent (or to ensure that a unit remains under safe and proper control, if it is traveling down a sloped railway on a mountainside). The design and programming of those types of controls are within the skill in the art, and can be performed by a combination of a fixed control system on the ground, a microprocessor system and various sensors on the gen/batt unit, and a telemetry system to send signals back and forth between the fixed system and the traveling system.

In addition, an external shell, cowl components with streamlined shapes, or similar components or design means can be used to minimize lateral wind resistance of a gen/batt unit, and to protect a gen/batt unit against dust and dirt, rain, etc.

Rails on Guyed Towers

A "guyed tower" system 200, as illustrated in FIG. 2, can be made of four component towers, erected in a square pattern when seen from above. A square pattern is convenient and simple, and provides distributed and symmetric coupling points for a gen/batt unit. However, square assemblies are not required, and other arrangements (such as rectangular, triangular, etc.) can be used if desired.

Each component tower (which includes the two "front" towers 180 and 190 shown in FIGS. 1 and 2) can be made of a metallic frame structure (often called a truss) with internal reinforcing segments that create multiple triangular segments enclosed within the outer components of the frames, as used in conventional broadcasting antennas. Since winds can blow through the open frames of such towers without creating high levels of lateral, shear, or bending forces, open-frame towers do not require as much strength, reinforcement, or expense as walled or enclosed structures would require.

Tower system 200 creates a rail track that rises vertically above the local ground level. For purposes of description, tower 200 can be assumed to rise to an elevation that can range between 100 and 300 meters (about 300 to 1000 feet). If desired, multiple square tracks can be created for running multiple gen/batt units simultaneously, by creating an array (or grid, cluster, etc.) of multiple towers connected to each other, either directly, or in a spaced pattern, using connective struts, rods, bars, cables, or other components.

A cluster of four tower truss components will be held upright and vertical by angled cables 202, attached to the towers at various heights. Those types of cables, which are anchored to the ground at various distances from the base of the tower, are often called "guy wires"; accordingly, towers that are held upright by such cables are often called "guyed towers".

Tower assembly 200 provide a vertical travel path that will enable a repeating cycle of ascent and descent by gen/batt unit 100. The requirement for an unobstructed path, for travel of the gen/batt unit, does not prevent the use of braces 216 at various heights around the periphery of the tower assembly, to hold the tower components at stable, fixed, reinforced distances from each other. For purposes of illustration, gen/batt unit 100 is shown as being wider than the spacing of tower components 180 and 190, in FIG. 2. That arrangement is practical, if any braces that connect the tower components to each other are shaped and arranged in an accommodating manner (such as with a "U" or "C" shape, when viewed from above) so that they will not interfere with travel of the gen/batt unit.

Alternately or additionally, a reinforcing brace can occupy the travel path of the gen/batt unit, if the brace is designed to swing out of the way, in a manner comparable to a drawbridge, each time a traveling gen/batt unit approaches a reinforcing brace. However, any design elements that would require intermittent "drawbridge"-type movements, by large and heavy components that will suffer from gradual wear and a risk of failure over a span of years or decades, generally should be avoided or minimized when possible. In addition, any design elements that will require unnecessary power consumption by the system will reduce its operating efficiency and net power output, and run a higher risk of failure during severe storms, when power from these types of units may become critically important.

FIG. 2 illustrates a single zeppelin 300, with no sail attached to it, above tower assembly 200. Because of its size (even when deflated), zeppelin 300 normally cannot and will not descend below the top of the tower assembly. Zeppelin 300 is coupled to gen/batt unit 100 via a strong tension-bearing cable 310. Rather than containing a metal alloy, any cables preferably should be made of a high-tech polymeric material (such as aramid, carbon, or graphite fibers, buckytubes, etc.) that has a strength-to-weight ratio substantially greater than steel cables.

In one preferred embodiment, cable 310 can be coupled directly to zeppelin 300; in an alternate embodiment, cable 310 can be coupled, directly or indirectly, to a plurality of additional cables that form a harness, which can: (i) distribute any tensile stresses on the zeppelin over multiple dispersed attachment points; and, (ii) provide "pitch" control over a zeppelin, to allow it to be flown with a "nose up" angle (or pitch) during ascent, and a "nose down" angle during descent, as described below.

The maximum height that can be reached by zeppelin 300 will be essentially equal to the height of tower assembly 200, plus the length of any coupling cable(s). For example, if tower assembly 200 is 700 feet high, and if it is positioned directly over a vertical tunnel 220 which adds another 500 feet to the length/height of the vertical rail track, the length of any coupling cable(s) would need to be at least 1200 feet, and presumably would be about 1500 feet long, to provide a "safety zone" that would prevent zeppelin 300 from getting dangerously close to the top of tower assembly 200. Accordingly, if a tunnel extends 500 feet below a 700 foot tower, and the coupling cable or harness is 1500 feet long, the zeppelin would descend, during each lifting cycle, to a point where its bottom surface reaches a minimum height of 1000 feet (i.e., 300 feet above the top of a tower that is 700 feet tall). During ascent, the bottom of zeppelin 300 will ascend to a maximum height of 2200 feet (i.e., 1500 feet above the top of the 700-foot tower). When zeppelin 300 reaches that altitude, gen/batt unit 100 will reach the top of tower assembly 200, and will be ready for release, and descent.

As a general rule, costs and failure risks both tend to increase exponentially, as a tower is built higher and higher, or as a tunnel is excavated deeper and deeper. Therefore, Aristotle's maxim ("Moderation in everything") comes into play when designing and building a system such as this. A system that combines an above-ground tower with a moderate height, aligned with a tunnel having a moderate depth, is likely to minimize construction costs, compared to a system built either entirely above-ground or below-ground and having the same "power stroke" length (i.e., the distance between the maximum and minimum elevations that the gen/batt unit will reach, measured on an "absolute" vertical scale, usually expressed as height above sea level).

Figure 6:
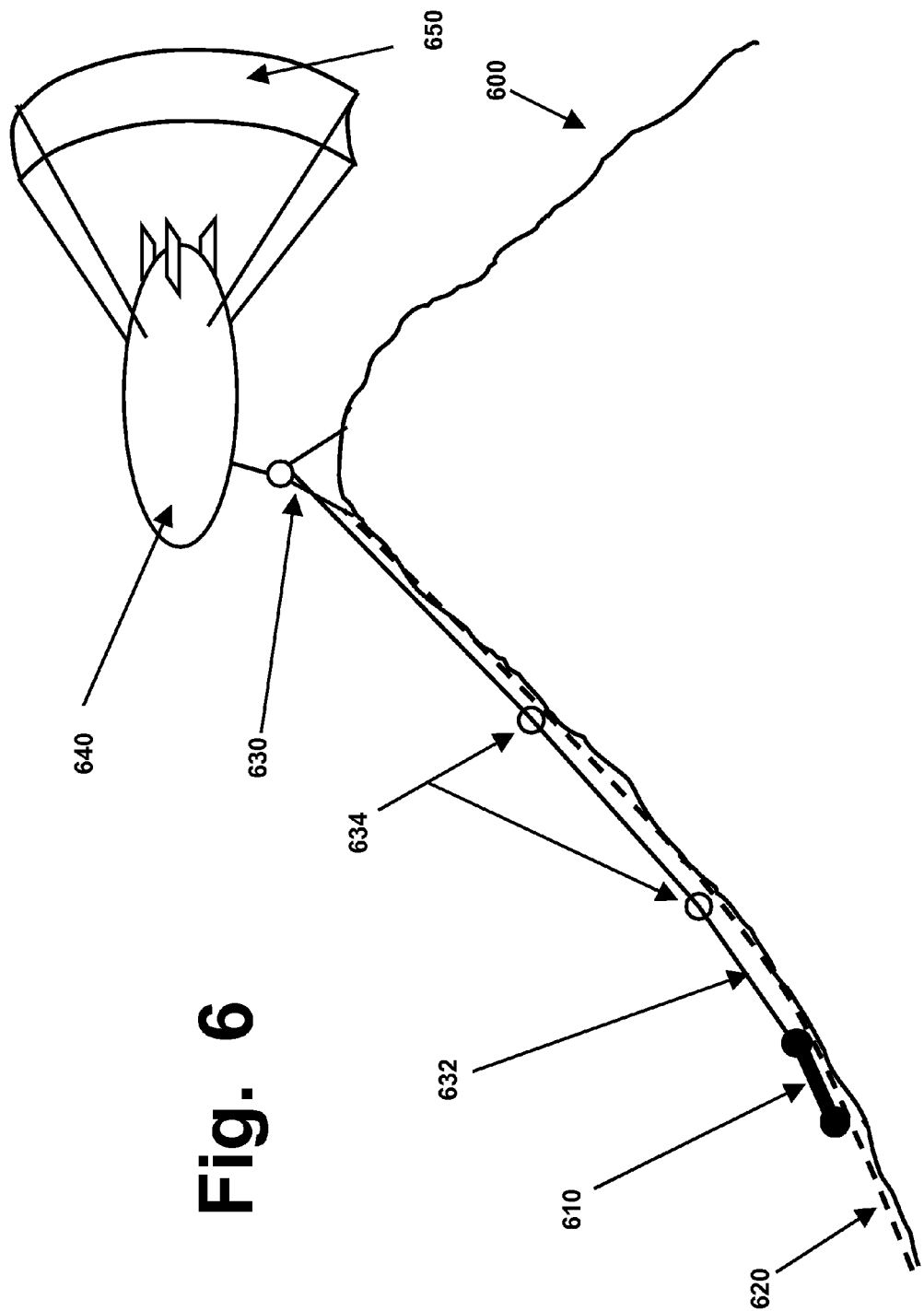
FIG. 6 depicts a massive and heavy car (which carries either generators, or an inert heavy weight such as sand) on a sloping track on the side of a hill or mountain. The heavy car is being pulled and lifted to the top of the track, by a combination of a zeppelin and a spinnaker sail.

Systems that make intelligent use of already-existing natural resources usually perform better and more efficiently than entirely artificial systems. Accordingly, in quite a few locations, a sloping rail track can be laid on the side of a large hill or mountain, as illustrated in FIG. 6, at considerably lower expense (and with greater strength, stability, and durability, and with easier access for maintenance) than building a strong and sturdy tower and/or tunnel system having the same vertical height.

This type of system also can be adapted for use with two or more zeppelins to lift each gen/batt unit, during successive cycles of ascent and descent. Gen/batt units will be designed for rapid descent, such as within 10 minutes or less unless a track on a mountainside has a vertical drop of multiple thousands of feet. By contrast, unless huge very-high-volume gas compressors are used, it likely will take substantially longer to deflate a zeppelin to a point where it changes from being able to lift 100 tons or more, to a point where it has low or neutral buoyancy and can be "reeled in" with relatively low power costs. Accordingly, an optimized system can use two or more zeppelins, in a fleet, which can be "swapped out", for moving any zeppelin that has completed an ascent leg into a "deflate and descend" pathway, which will not interfere with the ascent pathway of a different zeppelin.

Aerodynamic Shape and Pitch Control, for Zeppelins

As mentioned in the Background section, in order to enable practical and economic use for power generation as described herein, a zeppelin or other "buoyant aircraft" must be able to exert a vertical lifting force of at least 5 tons, when calculated or measured at sea level. This is intended to distinguish these types of relatively large buoyant aircraft from toys, weather balloons, prototypes or scale models designed for testing, etc. As mentioned below, a buoyant aircraft that can lift 5 tons, vertically, can pull a gen/batt unit that weighs up to 10 tons, up a rail track that has a slope of up to 30°, on the side of a hill or mountain.

Zeppelin 300, as shown in FIG. 2, will comprise an envelope made of a thin high-tech polymeric sheet (or layer, skin, etc.) stretched across the surface of a strong internal frame. Unless a completely round-and-flat disc shape (presumably comparable to the type of discus hurled by track-and-field athletes) is used, zeppelin 300 will be elongated, and will have a forward end 310 (which also can be called the fore, nose, prow, bow, or upwind end, or similar terms derived from boats and/or aircraft), and a tail end 320 (which also can be called the stern, aft, or downwind end, or similar terms). The tail end 320 can have stabilizer fins 322, which can be provided with movable "flaps" or placed on rotatable mounts for additional control.

To provide still more control, greater ascending power, and faster descending speeds, wings or fins also can be mounted on the sides of a zeppelin, presumably in left/right pairs similar to airplane wings. In a preferred embodiment, such wings, fins, or other struts or protrusions can be provided with propeller engines, for additional power and control, and they can be affixed to axles or mounts that allow rotation of any wings or flaps into either vertical or horizontal directions. If the wings or fins can be rotated around a 270 degree arc (i.e., ¾ of a circle), the propeller engines can be rotated in directions ranging from straight down (for descent), through "full forward" (horizontal), through straight up (for ascent), through "full reverse" (horizontal), without requiring the additional mechanical complexity that would be required to provide fuel to engines that can rotate through complete 360 degree arcs. Alternately, if a gearing system is provided that can reverse the direction of the propellers, similar results can be provided by wings that can rotate through a 90 or 180 degree arc.

If propeller engines are provided, they can burn hydrogen gas as their fuel. This can both: (i) increase the buoyant force that a zeppelin can exert during ascent, since it will eliminate any need to also carry a supply of liquid fuel for the engines; and, (ii) decrease the quantity of hydrogen gas that must be pumped into high-pressure tanks, to enable reasonably rapid descent.

Routine testing, using a combination of computer modeling and scale model tests in wind tunnels, can determine the optimal shape and dimensions for a zeppelin as disclosed herein. For example, a zeppelin can be given a widened and/or flattened shape, when seen in a "transverse" cross-section (i.e., in an imaginary vertical plane that passes from left to right, perpendicular to the nose-to-tail axis of the airship; typical zeppelins or blimps have circular transverse cross-sectional shapes). A widened or flattened body shape can allow the entire craft to act in a manner comparable to a sail, wing, or kite, when the zeppelin is rotated into either a "nose up" pitch (or angle, orientation, or similar terms) during ascent, or a "nose down" pitch during descent. "Pitch" refers to rotation of a boat or aircraft about an imaginary lateral (or transverse) axis, passing horizontally between the left and right sides. The two other types of rotation of a boat or aircraft are called "yaw" if the imaginary axis is vertical, and "roll" if the imaginary axis passes from the nose to the tail.

Accordingly, if a relatively wide and flat zeppelin is provided with "pitch control", it will allow the zeppelin to utilize wind force (which will be substantial, at most locations that will be chosen for these types of units, at the altitudes of interest) to help it generate additional lifting force during ascent, and "diving force" during descent. Pitch control should be provided, since the ability to use wind power to increase the speed and power of both ascent and descent can increase the efficiency and output of a power generating system, as indicated by FIGS. 3 and 4.

Pitch control systems can be provided in any of several ways, as briefly summarized below, and as will be recognized in more detail by anyone who works in aviation. Furthermore, different types of components and subassemblies that can contribute to pitch control can be used in combination.

One way to establish pitch control, which is illustrated in FIGS. 3 and 4, is by using a "harness"-type attachment that has one or more forward attachment cables 332, and one or more aft attachment cables 334. As indicated by their names, forward attachment cable(s) 332 will be affixed to zeppelin 300 at a location that is forward of the center point of the zeppelin, while aft attachment cable(s) 334 will be affixed to zeppelin 300 at a location that is "aft" (i.e., toward the tail end) of the center point. In most cases, the geometric center point of a zeppelin will closely correspond to a location that can be called either the center of gravity, or the center of buoyancy; this location is also called the centroid, by engineers. If the surrounding air is still, so that wind forces can be ignored, any buoyant zeppelin will always attempt to orient itself in a direction and angle so that its center of gravity (or buoyancy) is at the highest altitude it can reach, while the zeppelin is constrained by any cable(s), harness, or other tethering device.

Accordingly, if a harness-type attachment is used to provide a forward attachment point and a rearward attachment point for each "longitudinal" harness cable (presumably, at least 2 or 3 major longitudinal cables will be used, roughly parallel with each other and spaced apart from each other between the left and right sides of the body), one or more powered winches 336 can be provided, which will travel back and forth along each cable, between two different locations. Regardless of where winch 336 is located at any given moment, it will effectively divide a longitudinal tethering or harness cable into a "forward" segment 332 and an "aft" segment 334, as shown in FIGS. 3 and 4.

When the zeppelin is ready to ascend, winch 336 will "crawl" along the harness cable toward the tail end of zeppelin 300. This will cause the "forward" harness cable segment 332 to become longer than the "aft" cable segment 334, thereby enabling the nose of the zeppelin to raise up, as depicted in FIG. 3. When that happens, the wind (which will be generally horizontal) will travel beneath the nose of the zeppelin, causing the wind to push upward, against the sloping bottom surface of the zeppelin. Therefore, if the zeppelin has a relatively wide and flat shape, the entire bottom surface of the zeppelin will act in a manner comparable to a wing or sail, and the wind pressure against the bottom of the zeppelin will increase the lifting force of the zeppelin.

Subsequently, after gen/batt unit 100 has reached the top of its rail track and has been released, winch 336 will "crawl" along the harness cable toward the nose of zeppelin 300. As shown in FIG. 4, this will shorten the "forward" harness cable segment 332, while lengthening the "aft" cable segment 334.

This will cause the zeppelin to rotate around the imaginary lateral (side-to-side) axis that passes through its center, thereby causing the nose of the zeppelin to descend into the position depicted in FIG. 4. When the zeppelin is floating with that "nose down" angle, the wind will push downward against the sloping top surface of the zeppelin, thereby helping force the zeppelin down. This will minimizing the amount of hydrogen or helium that needs to be suctioned out of the zeppelin and pumped into high-pressure tanks, to enable the zeppelin to descend at a useful and practical speed.

Alternate or additional designs and components can be used to switch a zeppelin back and forth between "nose up" and "nose down" positions, for the alternating ascent and descent legs of a power cycle. For example, if a tether coupling device on the bottom side of the zeppelin is able to travel along a track toward either the fore or aft end of the zeppelin, it will pull the nose of the zeppelin downward as it travels toward the nose, at the start of a descent stage, and it will allow the nose to rise, when ascent is ready to begin, by traveling toward the tail end.

Alternately or additionally, pitch control can be provided by using a fan or compressor to transfer hydrogen or helium back and forth between either of two alternate chambers within or affixed to the zeppelin, or by providing an "add-on" or "piggy-back" chamber filled with hydrogen or helium that can travel along the length of the zeppelin, presumably on its top surface.

Similarly, if a set of pumps and tanks are carried within (or suspended beneath) a zeppelin, they can be mounted on a relatively short track that extends in the fore/aft direction. During ascent, the pumps and tanks can be moved toward the rear of the zeppelin, to help establish a "nose up" pitch. During descent, the pumps and tanks can be moved toward the nose of the zeppelin, to help establish and maintain a "nose down" pitch.

If desired, tethering cables anchored to the ground, and to locations near the fore and aft ends of the zeppelin, can be used for pitch control. However, any cable that would pull the zeppelin downward, while exerting a corresponding upward tensile force on a component anchored to the ground, would reduce the lifting force of the zeppelin, and it would also reduce the efficiency and net power output of the entire system. Therefore, designs that enable a zeppelin to exert all of its lifting force on a traveling gen/batt unit are preferred.

Additional design options that also merit evaluation include, for example:

1. squared side edges, as illustrated in FIG. 2. Although these are not conventional in buoyant aircraft, they likely can increase the lifting force created by a wide zeppelin, since they can reduce the tendency of wind to simply blow around the sides of a rounded object;

2. a relatively sharp horizontal leading edge, rather than a blunt rounded nose, at the forward tip of the zeppelin;

3. parallel vertical fins that extend along the entire top and bottom lengths of a wide zeppelin, at or near its side edges, in a manner that will create trough-like surfaces on the top and bottom, to reduce the tendency of wind that is pressing against the top or bottom of the zeppelin to move laterally toward and then off the sides of the zeppelin, where it would be lost; and, 4. one or more parallel vertical fins that extend along the entire top and bottom surfaces of a zeppelin (or along substantial portions thereof), at spaced intervals between the outer lateral edges, to create additional trough-like surfaces that can help channel and distribute wind force more evenly across the top or bottom surface of a nose-up or nose-down zeppelin during ascent or descent.

To minimize any stresses imposed on the thin and flexible skin of a zeppelin, any couplings or connections that use cables or other tensile components will be made to frame components, rather than to the skin. The zeppelin can carry any pumps and high-pressure tanks either within the zeppelin, or suspended beneath the zeppelin. Suspension of at least some of the heavier pump and tank components beneath the zeppelin (such as within an elongated, streamlined, and possibly wing-shaped "pod" that can be kept any desired distance below the zeppelin by means of cables or struts, and which can be provided with pitch control, for ascent and descent) can provide better access to the equipment for maintenance, and modular construction with "quick connect" fittings can allow a pump and tank pod to be swapped out rapidly, to allow a zeppelin to return to service very quickly if its pump and tank system needs to be repaired or replaced. However, even if the heaviest pumps and all of the tanks are suspended in a pod beneath a zeppelin, at least some fan or compressor intake components (or "first stage compressors") generally should remain inside the zeppelin, to speed up gas transfer rates at the start of descent. Accordingly, access to such equipment in enclosed compartments can be provided by means of doors, panels, or other movable or removable segments.

When heavy pumps and tanks travel up and down with the zeppelin, they will not seriously reduce the efficiency of this power-generating system; instead, they will effectively create a "one-time-only expense", roughly equivalent to requiring the zeppelin to be given an extra volume of helium or hydrogen with enough buoyant force to balance out and "neutralize" the weight of the pump and tank equipment. This arises from the cyclic nature of the operating system. The weight of the tanks and pumps will reduce the buoyancy of the zeppelin, during the ascent leg of each power cycle; however, that same weight will help the zeppelin descend back to its lowest altitude, during each descent, thereby reducing the amount of hydrogen or helium that must be suctioned out of the zeppelin envelope and pumped into the tanks. Accordingly, any losses that occur during ascent will be effectively "neutralized" and recovered during descent.

As mentioned above, the "tensile subassembly" that will be used to connect a zeppelin and/or sail system to a heavy car (such as gen/batt unit 100, in FIGS. 1 and 2) must have hitching or coupling components that will allow the release of the heavy car from the lifting and pulling cable (or similar tensile component), each time the heavy car has reached a release height, at or near the top of its track. If a tower assembly 200 is involved, as indicated in FIGS. 1 and 2, during each release operation, a locking mechanism can be used to prevent any rotation of the wheels or generator shafts, to ensure safe transfer of the weight of gen/batt unit 100 from zeppelin 300, to the tower frame. After that load transfer has been checked out for stability and safety, any steps that may be necessary to complete the uncoupling operation will be completed, and gen/batt unit 100 will be ready to begin its descent down the track.

Tower assembly 200 preferably should be provided with means for lowering a zeppelin 300 to or near the ground, to protect it against damage by heavy storms. For example, if a powerful storm with heavy winds or risk of lightning is approaching, the heavy gen/batt unit 100 can be released from cable 310 and allowed to descend, to complete one last power cycle, while zeppelin 300 is moved laterally under the control of cable 310 (and possibly other backup cables as well), in a manner that allows zeppelin 300 to be lowered to the ground, presumably somewhere close to tower assembly 200, where it can be secured and protected (such as in a hanger, or covered by a large net or sheet) to prevent damage to the zeppelin 300 while the storm passes. If desired, fore and aft backup cables, which normally can stay rolled up on reels or spools inside compartments on the underside of the zeppelin, can be unreeled and lowered to the ground, to facilitate rapid securing of a zeppelin when a storm is approaching, and rapid redeployment after a storm passes.

Methods and Devices for Efficient Handling of Gas

Various types of equipment and methods can be used to increase the speed and efficiency of the handling and pumping of helium and/or hydrogen gas. The following items are examples of equipment and methods that can be evaluated for use in obtaining increased efficiency when a buoyant gas must be compressed, so that the zeppelin will descend properly and with minimal energy requirements. Those skilled in the art of handling buoyant gases will recognize other options and improvements, and any currently-known or hereafter discovered device, machine, or method for handling helium or hydrogen can be evaluated for use as described herein.

1. Various types (and numbers) of large propellers, wind turbines, and similar devices can be mounted at any suitable location on or near a tower, railtrack, or zeppelin. For example, the Skyhook system offers an example of how powered propellers can be mounted to a zeppelin, at the ends of fixed or rotatable shafts that place the propellers a safe distance away from the gas envelope. That type of design can be modified so that, instead of burning fuel to drive propellers that will move a vehicle, the propellers can function instead as wind turbines, to harvest wind energy. That harvested energy can be used to drive fans or compressors that will help pump gas from a zeppelin envelope, into pressurized tanks 2. "Staged" compression can be used, such as 2-stage, 3-stage, or 4-stage compression. In the first stage, a gas can be compressed from low pressure, to a moderate pressure. If desired, this first-stage compression can use fan blades, compressor rotors, "scroll pumps" (described and illustrated in sources such as Wikipedia), etc. In the next stage, the moderately-elevated pressure will help drive the gas more efficiently into the "intake" of a second-stage compressor; this will help the second-stage compressor work with greater efficiency. Similarly, after a fairly high "double-stepped" pressure is reached, the pressurized gases will begin behaving in ways that begin to resemble liquids. This allows other types of pumping systems to be used, including pistons that push gases or liquids through conduits with check valves, into high-pressure containers, rather than the spinning rotors of compressors that function like fan blades. Accordingly, two-stage or multi-stage compression can be substantially more efficient than single-stage compression.

3. Another type of system may be able to create a mild but useful initial compression, in the type of multi-stage compression system mentioned above. It may be possible to develop a system for using a number of fibers or cables, attached at multiple distributed points across a large membrane surface (or around a mesh-type device that is embedded within, or placed behind, a large membrane surface), to create a slight but significant gas compression, within one or more large gas compartments of a zeppelin. For example, if a set of cables is wrapped around a rotatable axle that acts in a manner comparable to a spool, the fibers or cables will be tightened and contracted when the axle is rotated, in a manner that can pull a membrane or net closer to the axle of the spool. This type of mechanism may be able to increase the pressure in a large gas compartment by, for example, one to three pounds per square inch (psi), which is only a fraction of "atmospheric" pressure (which is about 14.7 psi, at sea level). Even though a pressure increase of only a few psi is not great, it can be substantial and worthwhile if exerted over a large volume, especially if it can help increase the efficiency of compressors.

4. Another method that may be able to help deflate a zeppelin more rapidly, and with lower energy costs, would involve turning a zeppelin "broadside" against the wind, while the zeppelin is securely affixed to strong cables that are anchored to fixed locations. If that type of "wind-aided deflation" is used, the power of the wind will press directly against the upwind side of a zeppelin, in a manner that may be able to generate a significant volume reduction and pressure increase, in the gas inside the zeppelin. This type of approach can be enhanced by using movable frame components inside the zeppelin to convert the "upwind side" of a zeppelin into a concave shape (comparable to the underside of a parachute) that will be efficient at capturing and using wind force, rather than facing the wind with a rounded convex surface that would make it easier for the wind to simply blow above and below the zeppelin.

If that approach is used, it could enable still more power and energy to be "harvested" from the wind, by synchronized manipulation of the tethering cables that would be used to maneuver a zeppelin into a position where a broad surface area would directly catch the wind. This can be done by a combination of: (i) "locking" those tethering cables that are coupled to the "farthest downwind" attachment points on the zeppelin, so that the "downwind edge" of the zeppelin will remain essentially stationary; (ii) allowing the wind to "unreel" the tethering cables that are coupled to the "upwind" edge of the zeppelin, so that those cables will be pulled out, as the zeppelin moves into a parachute-like "wind catching" position; and, (iii) using the force that "unreels" the cables on the "upwind edge" of the zeppelin, to drive the rotation of wire coils in a generator.

Subsequently, after that type of maneuver has been used to obtain a cost-free (or even power-generating) "first stage compression" of the gas inside a zeppelin, the tethering cables along one edge of the zeppelin can be partially released, allowing the zeppelin to move back into a position that minimizes its wind resistance, so that it can be "reeled in" and returned to a point where it will be ready to commence an ascent leg during the next power-generating cycle.

Spinnaker Sails

The second major type of lifting/pulling device that can be used to lift a heavy car to the highest point on a track, in a power-generating system, comprises one or more sails. The types of sails that would be suited for such use fall within a category commonly known as "spinnaker" sails, which also can be called parachute sails, pulling sails, tensile sails, or similar terms. Rather than having triangular shapes (as commonly used on sailboats, which are designed to be maneuvered by using masts and booms, in ways that enable sailboats to sail upwind by using "tacking" maneuvers), spinnaker-type sails normally are deployed only from the fore end of a boat, and only when a sailboat is heading downwind. When filled with wind, a spinnaker-type sail generally assumes a rounded configuration that approaches a hemispherical shape, comparable to a parachute; if desired, that shape can be modified, by means of reinforced fabric junctions or seams, additional tethering lines, etc.

Spinnaker sails can have square, rectangular, circular, or other flat and planar shapes, made from a single flat piece of fabric or membrane; alternately, they can be given non-planar sculpted-type shapes, by means such as sewing or otherwise bonding or assembling one or more segments of fabric (which can form, for example, a conical shape), or by specialized weaving, knitting, or other techniques (such as used to form a hemispherical parachute shape). They can be made from woven, knitted, or other fabrics assembled from fibers, or from polymeric sheets that are created as non-fibrous membranes or layers. They can be provided with straps or other reinforcing components at any desired locations, and they also can be provided with vents, including vents controlled by springs, elastic straps, slidable panels controlled by sensors or microprocessors, or similar constraints that will yield, thereby allowing one or more vents to open if strong winds create forces that should be modulated, either to prevent a risk of damage to the sail, or to optimize operation of the system.

Accordingly, the terms sail, spinnaker-type sail, and spinnaker sail are used interchangeably herein, and refer to a sheet or other segment or assembly of material that is tethered or otherwise coupled to one or more cables or other tensile members, and that is designed and suited to be deployed in a manner that uses wind power to generate a tensile force that operates in generally the same direction as the wind, and that can be used to pull and lift a heavy traveling unit higher, on a vertical or sloping track. Additional information involving design variations and options that pertain to these types of sails can be obtained from experts who design and make maritime sails and drogue anchors, or who design and make parachutes and drogue chutes.

In one preferred embodiment, a spinnaker sail can be affixed (by cables, pulleys, and other mechanical devices) to the tail (or aft, stern, downwind, etc.) end of a zeppelin, as illustrated in FIG. 5, described below. In a second preferred embodiment, a spinnaker sail can be coupled directly to the same tensile subassembly that a zeppelin is coupled to, without creating an indirect coupling via the zeppelin frame.

In an third preferred embodiment, a spinnaker-type sail can be designed for use without a buoyant aircraft, provided that suitable means are provided for deploying and retrieving it. For example, if the prevailing winds at the location of a "sail powered" unit are strong on some particular day, a relatively small and lightweight balloon (comparable to a weather balloon), or a kite-like device that rises when lifted by the wind, can be used to lift a spinnaker-type sail and cable-handling assembly to an operating height above the top of a tower or mountain track. Since these lifting devices can be relatively small (such as a weather balloon, a kite-like device, etc.), a device or subassembly designed to lift a relatively lightweight sail (as distinct from a zeppelin that can lift more than 5 tons) is referred to herein and in the claims as a "sail-lifting device". This is different and distinct from a zeppelin or other buoyant "aircraft" that is large enough to directly help pull a heavy car up a sloped or vertical track.

For example, if a spinnaker-type sail and its cable-handling unit (including the cables, spreader bars, etc.) weigh 100 kilograms (about 220 pounds) when assembled, then a sail-lifting device, such as a weather balloon filled with hydrogen or helium and which generates a vertical lifting force slightly greater than 100 kg, can be used to keep the sail at least as high as the top of a tower or mountaintop. The spinnaker sail will be filled by the wind, pulling it horizontally until the tethering cable is essentially level and horizontal, and the sail will generate enough pulling force to lift a heavy car to the top of its track.

If the winds in the location of this type of power-generating unit are fairly consistent, and can be relied upon to keep the sail a safe distance away from a tower or other object that poses a risk of entangling the sail, then a sail-lifting balloon may not be necessary, during a typical power-generating cycle. However, since wind speed usually cannot be relied upon, and since the damage to a relatively thin and fragile sail could be severe it if becomes snagged or entangled on something on or near the ground, the use of a weather balloon or similar device, to ensure that the sail remains at a safe operating height at all times (except when a storm is approaching and the system must be temporarily shut down, for safety), usually will be prudent. Since a weather balloon or similar sail-lifting device will not require maintenance and will not be involved in or affected by any gas-pumping cycle, it can offer a low-cost means for protecting a sail.

Regardless of whether a spinnaker sail is used with or without a zeppelin unit, by establishing a "deploy and retract" cycle for a sail that is synchronized with the ascent and descent of a heavy car, a spinnaker-type sail can be deployed in a manner that generates maximum tensile force during the ascent leg of a power-generating cycle, to help pull a heavy car to the top of its track. After the heavy car has reached its highest point and has been released from the pulling and lifting system, the mooring cables affixed to one edge of the sail can be relaxed (or unspooled, extended, or similar terms), without being completely released. This will allow the sail to flutter in the wind without generating large pulling forces, comparable to a flag that flutters in the wind, or a sheet that hangs down from a clothesline. This will allow the sail (and/or a zeppelin to which a sail is attached) to be pulled back to its "starting point" with minimal power requirements, to prepare it for another ascent.

If necessary, deployment of a sail can be aided by deployment (or "stiffener") components. For example, stiffener components can be glued, stitched, or otherwise affixed to a square or rectangular sail in an "X" configuration, with each leg of the "X" stretching between opposed corners of a square or rectangular sail. If desired, these types of stiffeners can be designed to alternate between a relaxed and flexible state, and a stiffened and extended state. For example, if a flexible hollow tube is inflated with air or a gas, the tube will become engorged and relatively stiff; then, when the pressure is released, the tube will become more flexible, even if it is not fully evacuated. As another alternative, certain types of specialized alloys and polymers (often referred to generically "shape-memory materials") have been developed, for medical and other uses, which undergo temperature-dependent phase transitions. Some of these materials become soft and flexible when cold, and stiffer and harder when heated, while other materials show the opposite behavior, and become stiff and hard when cold, and softer when heated. Since any of those materials can be either heated directly by electric current or bonded to a flexible electric heating element, they can provide sail deployment aids that can be controlled electronically.

If a sail system is used without a zeppelin, the cable system that is used to couple the sail to a heavy car, during a lifting cycle, can utilize an automated gearing system, which will enable the sail to lift a heavy car over a wide range of wind speeds. If the wind speed during a lifting cycle is relatively low, the lifting cable can be shifted to a "low gear", which will cause the car to be lifted slowly but steadily up the track. This would be comparable to a rider on a 10-speed bicycle shifting into "first gear" to climb a steep slope. If wind speed is high, the lifting cable can be shifted into "high gear", causing the car to be pulled up the track more rapidly, thereby reducing the cycle time, and enabling a system to complete more cycles (and generate more power) during each hour or day of operation.

Any of various known types of gearing systems (which can be automated) can be used to accomplish that. For example, readings can be taken by a device that will continuously measure the tension that is being applied to a sail-coupling cable. Those readings can be fed to a microprocessor, which can determine which pulley or "sprocket" a cable or chain should engage at any particular moment, from a array of parallel pulleys or sprockets having a range of diameters, mounted next to each other on an axle. This type of arrangement is analogous to the chain sprockets used on the rear wheels of multi-speed bicycles. By adjusting a lever attached to a small cable, a bicycle rider on a typical 10-speed bicycle can align his bicycle chain with any of 5 different geared sprockets on the rear wheel. When the largest sprocket on the rear wheel engages the chain, it provides a "low" gear that generates maximum torque on the rear wheel, for riding up a hill, at the expense of reduced speed. When a series of smaller sprockets on the rear wheel are engaged by the chain, they provide higher gear levels that generate lower torque but greater speed, for level or downhill surfaces.

Accordingly, FIG. 5 (which is not drawn to scale, so that the various components can be illustrated more clearly) depicts the top of a tower 400, with a vertical cable or chain 402 passing through it and coupled to a heavy gen/batt unit (not shown in FIG. 5). A plate 404 mounted on top of tower 400 supports a gearing assembly 406, which has multiple sprockets or pulleys with a range of progressively smaller diameters. A cable or chain 408 engages one sprocket or pulley at any given moment, during an ascent leg of the power-generating cycle; under the control of a computerized control unit, the amount of tensile force being exerted on the cable or chain 408 at any moment will determine which sprocket or pulley will be engaged by the cable or chain 408 at that moment. The plate 404, and the gearing assembly 406 which is mounted on the plate 404, are capable of rotating in any direction, in response to changes in the direction of the wind, in a manner comparable to a weather vane.

As also mentioned herein, it should be noted that, in addition to using gearing systems, the size and weight of a car or train that will be pulled up the track, during any particular lifting cycle, also can be modified. For example, an operating company might have three different heavy car units, each weighing approximately the same, and each one mounted on its own wheeled chassis, built by adapting a flatbed car or boxcar purchased from a railroad company. If the wind is light and slow, a single heavy car can be used; if the wind is moderate, two heavy cars can be hitched or coupled together, to double the weight of the traveling unit; and if the wind is strong, three heavy cars can be hitched or coupled together, to provide three times the weight and power-generating capacity of a single-car system.

Accordingly, in the embodiment shown in FIG. 5, the force that will lift a heavy car or train to the top of its track is provided entirely by spinnaker sail 500, which will be filled and powered by wind, without a zeppelin system involved. A relatively small buoyant balloon 550 is coupled to cable-handling unit 510, which in one preferred embodiment can comprise an upper "spreader bar" 520 and a lower spreader bar 530, both of which will be generally horizontal. The two "top" cables 522 and 524 are coupled to the upper spreader bar 520 at or near its ends, to keep the top edge 501 of sail 500 from becoming entangled, while the two "lower" cables 532 and 534 are coupled to the ends of lower spreader bar 530. The entire balloon, sail, and cable-handling unit is coupled, via cable or chain 408, to the gearing system 406 at the top of tower 400.

During a descent stage, and until an ascent cycle is ready to begin, sail 500 can flutter in the wind, with only the two "top cables" 522 and 524 under mild tension, while "bottom cables" 532 and 534 will be slack. Therefore, sail 500 will not generate substantial pulling force during descent and retraction, and balloon 550 will be holding the fluttering sail 500 and the cable handling unit 510 at a safe height above the top of the tower, to prevent the sail from becoming entangled or snagged in any tower components or ground elements.

Alternately or additionally, a spinnaker-type sail can be deployed and retracted (either fully, or to any desired extent depending on wind conditions) in a reversible cyclic manner, by wrapping the fabric or membrane of the sail around a rod, pole, or similar device that can be rotated, in a manner comparable to a spool. To prepare for an ascent leg of a power cycle, the sail can be unreeled from the rod or spool, and to prepare for descent, the sail can be reeled in and retracted.

In a preferred embodiment of an operating cycle, when an ascent stage of a power-generating cycle is ready to begin, the lower spreader bar 530 will begin to reel in and shorten the two bottom cables 532 and 534, until they begin pulling the sail into the path of the wind. This will cause sail 500 to begin to fill with wind deploy, and sail 500 will begin to exert a large pulling force on cable or chain 408. Since this large horizontal force will be much greater than the buoyant lifting force generated by the relatively small balloon 550, cable or chain 408 will be pulled into an essentially horizontal position.

Rather than using a large amount of power and energy to reel in and retract the two bottom cables 532 and 534 against the strong force that will be generated when sail 500 begins to be filled by the wind, the top cables 522 and 524 will be unreeled a suitable distance, until sail 500 is fully deployed. Assuming that the wind speed on that day is not dangerously high, "fully deployed" implies that the "projected area" of sail 500 (i.e., the total "apparent area" of the somewhat rounded and curving sail, in a vertical plane perpendicular to the horizontal direction of the wind) will be maximized, thereby causing sail 500 to "catch" as much wind as possible, to generate maximum tensile force that will pull and lift a heavy car to the top of a track, as rapidly as possible.

Subsequently, during a descent leg of the cycle, when the bottom cables 532 and 534 are slack and the sail 500 is fluttering rather than deployed, the top cables 522 and 524 can be reeled back in to a "starting" position, with relatively little resistance and low power requirements.

If desired, each of the spreader bars 520 and 530 can be provided with one or more internal springs or other devices that can be "wound up" or otherwise charged to a state of high stored energy, as the cables are being extracted and extended by the pulling force of the sail. That stored energy can later be used to provide at least part of the power that will be required to "reel in" the cables, when an appropriate time arrives during a power-generating cycle.

Advantages of Sails Over Rotor Blades

One of the major factors that can help motivate and drive the testing and developing of sail-powered units for generating electric power arises from the fact that the useful force, power, and work that can be generated by a spinnaker sail can be much greater than the comparable levels of force, power, and work that can be generated by a set of wind turbine blades having a comparable cost. This arises from two major inefficiency factors, which can be summarized as follows:

1. In conventional wind turbines, the rotor blades occupy only a very small portion of the "swept area" of the turbine blades. Precise numbers are not available, and those numbers vary, as "variable pitch" rotors are rotated to different angles, depending on wind speed. However, simple visual examination of pictures of standard wind turbines indicate that the amount of the "swept area" that is actually occupied by the rotor blades, at any given moment, is less than about 5% of the swept area, and appears to be only about 3 percent. Wind simply blows through the unoccupied 95 to 97% percent of the "swept area" of a rotor, without transferring any power to the rotor blades, and without helping drive rotation of the wire coils inside a generator.

Presumably, that design (which is very different from conventional fan blades, boat propellers, etc.) is designed to achieve optimal economics, when the size, height, and strength of the free-standing towers that are used (which do not have guy wires) are taken into account. Accordingly, it would appear that potentially improved wind turbine designs might be achieved, if an angled guy wire, anchored to the ground, were securely attached to a nonrotating eyebolt that extends out in front of the turbine blades, at the tip of the axle mount positioned at the center of the rotating blades. However, that would be a different invention than the one disclosed herein, and it may become of interest, in the future, for a continuation-in-part application in the US, or for separate applications in countries that do not allow "continuing" practice as allowed in the US. For example, if such a guy wire were affixed to a ground anchor that could travel along an arc while remaining the same distance from its attachment point at the tip of the elevated axle at the top of the tower, such a system, at least in most locations, would be able to properly align with the wind about 95 to 99% of the time.

2. The second major inefficiency factor that several reduces the amount of power that can be generated by wind turbines is this: a rotor having a sloped and angled "impact surface" can capture and use only a fraction of the wind power that actually impacts the rotor surface. As wind passes through a rotor in the dominant direction of the wind, the rotor blades must create force in a direction that is very different from, not aligned with, and actually perpendicular to, the direction of the wind. The blades accomplish that by using sloped surfaces. However, when sloped surfaces are used to change the direction of a driving force, only a portion of the wind power can be harvested and converted into usable power.

Both of those two major inefficiencies can be avoided and eliminated, by the use of a spinnaker sail instead of a propeller-type rotor. Rather than using sloped blades that occupy only a small fraction of a "swept area", a spinnaker-type sail occupies and uses every bit of its entire "projected" area, in a way that effectively "traps" the wind and forces it to move the sail, in stronger and more powerful ways than can be accomplished by "skinny" rotor blades that occupy only a very small portion of the area they sweep across. In addition, rather than using sloped surfaces to inefficiently convert force that is moving in one direction, into a non-aligned and indeed perpendicular direction, a spinnaker-type sail aligns itself in a way that uses the direction and full force of the wind with 100% efficiency.

For both reasons, a spinnaker sail can generate higher pulling and lifting forces, compared to a rotor with sloped and skinny blades. Furthermore, the horizontal pulling force that is generated by a spinnaker-type sail can be converted into a vertical lifting force, with essentially zero losses and very high efficiency. This can be done by simple mechanical devices; for example, a simple pulley wheel can enable a cable that is being pulled in one direction (such as horizontally, by a wind-filled spinnaker sail) to exert that exact same amount of pulling force, with no losses whatever, in any desired vertical or sloping direction. Unlike the angled surface of a propeller blade that can only move perpendicular to the wind, the use of a pulley and cable system will enable a spinnaker sail to lift and pull a heavy car to a high elevation, with essentially no loss of force, strength, or power.

Finally, if suitable fibers and polymers are used to make the sail and its tethering cables, and if a suitably automated control system is used, it will be possible to use sails over a broader range of wind speeds, compared to the limits imposed on wind turbines by their "cut-in" and "cut-out" wind speeds. As mentioned above, none of the General Electric wind turbines that are displayed on the web pages cited above can generate any power at all, unless and until the wind speed reaches a "cut-in" speed of at least 3.5 meters/second (about 8 mph); and, to protect the turbine and generator, the power must be shut off if wind speed exceeds a "cut-out" speed, which ranges from 45 to 60 mph, depending on the unit.

By contrast, sails can generate pulling force at nearly any wind speed that is likely to occur at the altitudes of interest, no matter how low, especially if a sail is held open by a semi-stiff frame or spine arrangement. At the other end of the "suitable velocity" range, if wind speeds are very high, a sail can be deployed only partially, to an extent that is safe under a particular set of conditions (these tactics are well-known to sailors, and are standard procedures in heavy storms). As mentioned above, if a spinnaker-type sail is used, partial deployment can be enabled by having the sail wrapped around a long rod or pole that can be rotated, in a manner comparable to a spool.

Furthermore, if a sail system is coupled to a zeppelin of suitable size, the zeppelin system can continue to operate even in the absence of any wind at all. Even if the zeppelin is relatively small, a gearing system, and a car hitching system that allows the number of cars in a train to be reduced when winds are low, can enable the system to continue operating, regardless of wind conditions.

In addition, any zeppelins, sails, cable-handling assemblies, or other components that are used as described herein should be designed in ways that will enable any component that may need maintenance or repair to be rapidly and conveniently "swapped out" and replaced by a backup unit, without shutting down the system for more than a few minutes. This can enable any zeppelin, sail, or cable assembly unit to be taken to a local hangar, shop, or other facility for repair, without requiring highly-trained specialists to work on complex heavy equipment at dangerous heights. Any sail or cable assembly should be designed to be carried across a ground surface by a conventional forklift or similar means, and any zeppelin should be designed so that it can be deflated to a level of only light buoyancy, so that it can be towed into a hangar, using no more than a trailer hitch on a pickup truck. The problems created by "down time", maintenance costs, shipping delays, and the need for highly-trained repair specialists and/or expensive repair equipment (such as assembly cranes) create serious problems of increased operating costs and reduced power output, on "wind farms" that use conventional wind turbines. Accordingly, the systems disclosed herein will allow any components that will need occasional repair or replacement to be brought down to the ground and "swapped out" quickly and conveniently, in ways that can minimize maintenance costs and down time.

Hillside/Mountainside Systems with Zeppelins and Sails

If properly combined and used together, in an integrated system, a buoyant aircraft and a spinnaker sail can assist each other in synergistic ways that will increase the efficiency and output of the combined system. In practical terms, a zeppelin can boost the performance of a sail, in two important ways:

(i) the zeppelin can lift the sail to higher altitudes, where greater wind speeds will generate more lifting power and speed; and, (ii) the zeppelin can enable a large sail to remain at safe operating altitudes, to eliminate the danger that a sail might become snagged or entangled by something on the ground or on a tower.

At the same time, a spinnaker-type sail can boost the performance of a zeppelin, by generating large and powerful pulling forces, which can greatly reduce the volume of helium or hydrogen that must be cycled back and forth between high-pressure tanks and a low-pressure envelope, during each power cycle.

Because large horizontal forces will be exerted on the top of a tower if a spinnaker-type sail is used, the most efficient and economic locations for installing integrated systems that combine a zeppelin and a sail likely will be on the tops of reasonably tall hills or small-to-moderate mountains, or within a valley or similar location that creates a "wind tunnel" effect. In general, any hill or mountain that can provide a vertical drop (for power generation) of at least about 150 meters (about 500 feet) may merit consideration, while optimal vertical drops are likely to be in a range of about 300 to 1000 meters (about 1000 to 3000 feet). Other features that will require consideration in choosing preferred locations will include the slope at a particular site (since it is cheaper to install a railroad-type track on a moderate slope that can be traversed by trucks, compared to a very steep slope or cliff face), and terrain stability (since any such unit should have a design life of multiple decades, despite any weather-induced erosion of the slope).

The direction of the wind at any moment, or the existence or absence of a dominant and predictable wind direction at some location where this type of facility might be installed, should not make a critical difference to the efficiency of this type of power-generating system, in most locations. If the assembly at the top of a tower has a "main pulley" wheel that is vertical (i.e., with a horizontal axle), mounted on a horizontal platform that can rotate in any direction (like a weathervane), this type of mechanism can redirect a pulling force being exerted on a cable in any direction, by a zeppelin and sail unit, into a pulling force that will exert its entire force, via a flexible cable or chain, along a constrained pathway that closely tracks a railway path that has been installed (or laid, affixed, secured, embedded, etc.) on the side of a hill or mountain.

Nevertheless, all potentially relevant factors must be taken into account in selecting optimal installation locations. Such factors include, for example, the presence and location of any nearby outcroppings, trees, or other surface items that might pose a risk of snagging or otherwise endangering a zeppelin and/or sail. If such risk factors are present in an otherwise ideal location, they presumably should be leveled or moved, when possible. The potential for installing a maintenance facility in a location close to a "set down" site that will be downwind from the tower location, the majority of the time, should also be considered.

Accordingly, FIG. 6 illustrates a hill or mountain 600 with a heavy car or train 610 that ascends and descends by riding a rail track 620 that has been laid on a sloping side of the hill or mountain 600. A relatively short tower 630 is installed at the top of the hill or mountain; unlike a tall guyed-tower system, as shown in FIG. 2, this type of "short tower" 630 must be designed to withstand large horizontal forces. Lifting cable or chain 632 will be coupled to the heavy car or train 610, and it will be kept aligned with rail track 620 by means of pulleys, sprockets, or similar cable-handling devices 634. The pulling force that will lift the heavy car or train 610 to or near the top of the hill or mountain 600 will be provided by a combination of a zeppelin 640 and a spinnaker sail 650, as described above.

The selection or design of any cable-handling components 634 for a specific installation will depend on site-specific factors, such as local terrain, the size and weight of the car or train units, the tightest curve in a proposed track, etc. Answers to those types of questions is within the skill of the art, and can be handled by mechanical and design engineers, conveyor or transport specialists, etc. More complex systems than will be required for the units discussed herein are already in use in various "roller coaster"-type rides, and the mechanisms used in those types of systems, and in the conveyor and transport systems used by large warehouses, online retailers, and similar companies, can be consulted for guidance on the types of devices and components that are available for use as described herein. Additional information on such machinery also is available from books such as K. Schtzmannsky, Roller Coaster: The *Roller Coaster Designer Werner Stengel* (Kehrer Verlag 2006); S. Rutherford, *The American Roller Coaster* (MBI 2000); S. Derby, *Design of Automatic Machinery* (Marcell Dekker/CRC 2004); J. L. Meriam and L. G. Kraige, *Engineering Mechanics: Dynamics* (5th edition, Wiley 2001); M. E. Fayed and T. S. Skocir, *Mechanical Conveyors: Selection and Operation* (CRC 1996); and "SIC 3535 CONVEYORS AND CONVEYING EQUIPMENT" (which can be purchased and downloaded online, from *Gale's Encyclopedia of American Industries*).

In addition, other textbooks, such as X. Wang and M. A. Schnabel, *Mixed Reality In Architecture, Design, And Construction* (Springer 2008), which analyzes the various stages of (and interfaces between) computer modeling, model testing, scaleup, and actual construction, and R. Norton, *Design of Machinery: An Introduction to the Synthesis and Analysis of Mechanisms and Machines* (McGraw-Hill 2003) provide still more information that can help engineers and others who begin working on these types of systems, and can also help establish a level of skill in several different fields of aerospace, gas-handling, and mechanical art that will come together in the invention disclosed herein.

For purposes of illustration, rail track 620 is shown installed entirely on one slope of a hill or mountain 600. That is not essential, and if suitable guide means are provided for the cable, chain, or other tension-bearing component that will be coupled to the gen/batt unit as it is being lifted, a track can wrap around all or any portion of a hill or mountain, and can even circle a hill or mountain several times. However, whenever machinery is designed to operate for decades in an outdoor environment, problems of corrosion, wear, breakage, and other types of deterioration must be taken into account. As a general rule, a rail path that is relatively straight, and that minimizes any need for guiding and constraining mechanisms that will handle components such as cables and heavy cars, likely will have lower maintenance costs, over time.

The Gas Cycle, and the Power Cycle

During each power-generating cycle that uses a zeppelin that is inflated and deflated in a repeating manner, the helium or hydrogen will undergo two major steps, as follows:

(i) at the start of the lifting (ascent) leg of each power-generating cycle, gas will be released from high-pressure tanks, into the envelope of a low-pressure zeppelin. This will cause the zeppelin to inflate and expand, thereby generating buoyant lifting force that will lift (or help lift) the gen/batt unit to the top of its rail track or other travel path; and, (ii) after the gen/batt unit has been uncoupled from the lifting zeppelin, and while the gen/batt unit generates electric power as it descends down the railway, at least some portion of the helium or hydrogen gas is suctioned out of the zeppelin and pumped back into high-pressure tanks, thereby causing the zeppelin to lose at least some of its buoyancy, to help it descend back to the lowest point on its track.

Accordingly, the operating steps of a system that uses a reciprocating zeppelin are summarized in FIG. 7, a flow chart.

The following comments should also be taken into account, in the design and operation of this type of system.

1. The amount of power generated during each cycle will depend on the total vertical distance that a heavy car or train descends (as measured by altitude or elevation), rather than on the length of the track. Accordingly, a steeper slope will allow a fixed vertical "drop" to be traversed by a shorter track. Since the speed of a descending car or train unit can be substantially higher on a track with a steeper slope, the use of steeper or even vertical slopes can increase the number of power cycles that can be completed each day. However, on mountainsides, steeper slopes tend to lead to higher construction costs, greater rates of erosion, etc., which must be taken into account.

2. The limit on how high a zeppelin can lift a heavy car arises from thinning of the atmosphere, which renders hydrogen or helium less buoyant, as the air grows thinner at high altitudes. The pressure and altitude table at www.csgnetwork.com/prestableinfo.html states that, under calm conditions, standard atmospheric pressure (which is 14.7 pounds per square inch, or psi, at sea level) drops to 13.03 psi at 3281 feet above sea level, 12.64 psi at 4101 feet, and 12.26 psi at 4921 feet. Since pressure is an indirect yet reasonable indicator of density, in gases, a reasonable approximation is that the lifting force of a zeppelin will decrease to about 88% of its buoyant force at sea level, by the time it reaches an altitude of 3281 feet (that percentage was determined by dividing 13.03 psi, at 3281 feet, by 14.7 psi at sea level). Buoyancy continues to drop, to about 86% at an altitude of 4101 feet, and to about 83%, at an altitude of 5000 feet. Those numbers are approximations, which do not take other factors into account, such as the amount of expansion that will be allowed by the skin of a zeppelin or balloon, which will increase slightly in size (thereby creating greater buoyant force) as altitude increases and air pressure drops.

3. Another important factor that will need to be taken into account, when buoyant craft are used, involves temperature. When a gas moves from a high-pressure tank to a low-pressure envelope, its temperature drops, and when the temperature of a gas decreases, its density increases. This will reduce, to some extent, the buoyant force that a zeppelin filled with hydrogen or helium can exert to lift a heavy car up a track. For any particular combination of conditions (such as tank pressure, zeppelin pressure, and ambient air temperatures at the altitudes of interest), computer modeling and scale-model testing can determine the extent to which buoyant forces will be lost due to a temperature drop caused by gas expansion. In the earliest units that are built and tested, an "allowance" or "cushion" for a loss of buoyancy in a range of about 5 to 10% should be factored into the initial designs, until computer modeling or scale-model testing can be used to establish more precise adjustment numbers.

Accordingly, for a system having a gen/batt unit with a predetermined weight and maximum ascent height, the buoyant craft must exert enough buoyant force to lift the gen/batt unit all the way to a maximum altitude, with enough spare or surplus buoyant force to ensure that the ascending speed of the zeppelin and the car, as they both approach their maximum heights, sustain a reasonable and practical speed. If the car slows down to a "crawl" speed as it approaches its peak, that would increase the "cycle time" for each complete cycle of ascent and descent, which would reduce the operating efficiency and power output for the entire system.

Conversely, it also should be noted that the total weight of a zeppelin (including the weight of its internal frame, and the weight of any wings, propeller engines, etc.) will not cause a major reduction in the operating efficiency of the system, and instead will operate in a manner comparable to a "one-time expense". This is because any surplus weight that is included for extra strength, a margin of safety, etc., will help pull a zeppelin downward during descent, and will reduce the amount of gas pumping that will need to take place during each descent leg of the cycle.

Use of Hydrogen Gas for Lifting

When used as disclosed herein, zeppelins or other buoyant aircraft can be filled by either hydrogen or helium. Hydrogen gas is roughly 8% less dense than helium, which enables it to provide greater buoyant force, and it is much more abundant, and much less expensive, than helium. However, hydrogen is highly flammable and even explosive. Since the risks of fire or explosion are hugely important (especially whenever powered machinery, and liquid fuel, must also be present), helium is strongly preferred for buoyant aircraft.

However, the types of buoyant aircraft disclosed herein are designed to be completely unmanned, and are designed to remain a safe distance away from any people, except when briefly lowered, such as when a severe storm is approaching, or for periodic maintenance. In view of those operating factors, the vastly greater abundance and lower cost of hydrogen is likely to justify its use in the systems disclosed herein.

Furthermore, there are ways to use both helium and hydrogen in a single system. For example, if helium and hydrogen are mixed together and then loaded into a single compartment (which can also be called a cell, chamber, etc.), the inert helium can reduce or even eliminate the flammability and explosive risk of the hydrogen.

In addition, if hydrogen (or a mixture of hydrogen and helium) is loaded into compartments positioned on the top side of a zeppelin, those compartments can be designed to burst open in an upward direction, if the hydrogen is ignited, without destroying any lower compartments that are filled with helium. This approach is comparable to designing a munitions or chemical factory with a "blast wall" made of thin and lightweight material that is designed to break or vent with little or no resistance, so that if an explosion occurs, any damage and injuries will be minimized.

Alternately, if hydrogen (or a hydrogen-helium mixture) is loaded into inner compartments that are surrounded by outer compartments filled with helium only, the layer of outer compartments can provide a surrounding protective layer, which can reduce any risk of breaching the inner hydrogen-filled compartments.

In addition, since the aircraft discussed herein are designed to go through lifting cycles that require repeated inflation and deflation, any compartments that contain hydrogen (or a mixture of hydrogen and helium) can be designed to remain full at all times. Only the compartments that contain helium would be inflated and deflated, during the different stages of each lifting cycle. This would minimize the extent to which hydrogen is subjected to potentially dangerous pumping and handling operations.

However, it also should be noted that if a zeppelin carries hydrogen in one or more cells, the hydrogen can be used as fuel, to provide power to any engines. As mentioned above, propeller engines can be placed on wings or struts that extend outwardly from the sides of a zeppelin; this type of design is used in the SKYHOOK™ system mentioned above, which is used for lifting and transporting cargo. In addition, any pumps or compressors that pump hydrogen or helium gas from a lower pressure, to a higher pressure, will require some type of fuel to power the engines that drive the pumps. If hydrogen gas is used as fuel by any such engines, it will reduce the buoyancy of a zeppelin, thereby aiding its descent during each descent leg of a power cycle.

Use of Zeppelins for Travel and Other Dual-Use Purposes

If zeppelin systems (either with or without spinnaker sails) are developed as described herein and are acquired by private companies, utility companies, government agencies, etc., they also can be used for various types of types of transport.

A full description of the options that would become available, if "dual-use" zeppelin systems are designed and developed in ways that can enable both power-generation and transport uses, is beyond the scope of this application, and is not necessary to support a patent application that focuses on the use of zeppelins that can ascend and descend repeatedly to help generate electric power. Nevertheless, if reasoned and realistic suggestions can be provided at the earliest stages of consideration, they may be able to help steer the design and development of buoyant aircraft in directions that can help promote and create dual-use systems suited for both power-generation and transport-related uses. Accordingly, the following comments are offered with that goal in mind.

1. To provide a balanced, controllable, and adaptable system that can enable powered and steerable transport of either people or cargo, a set of four propeller engines can be mounted around the periphery of a zeppelin, on wings or fins that preferably should rotate on horizontal axles or mounts. When seen in a "plan view" (i.e., from above), the four wings (or flaps, fins, struts, etc.) would have locations that can be referred to by terms such as forward left, forward right, rear left, and rear right, analogous to the placement of tires on a conventional automobile. As mentioned above, if the wings or fins can be rotated around a 270° arc (i.e., ¾ of a circle), this would enable the propeller engines to be rotated in any direction ranging from straight down (for descent), through forward horizontal, through straight up, to reverse horizontal, without requiring the additional mechanics that would be required to provide fuel to engines that can rotate through complete 360° arcs. Alternately, if a gearing system is provided that can reverse the direction of the propellers, similar results can be provided by wings that can rotate through a 90° arc.

2. While a power-generating system as described herein could not operate efficiently if all or most of its zeppelins are detached and used for transport purposes once they have completed an ascent leg of a power-generating cycle, the potential for timed and occasional release of a zeppelin, for either recreational or practical transport, should not be disregarded. In terms of recreational transport, quite a few people are willing to pay hundreds of dollars each, for a ride in a hot air balloon. A zeppelin can provide a similar enjoyable and memorable experience, in a manner that could provide a potentially significant income stream for a company that is deciding whether to purchase and operate such a system.

3. In terms of practical transport, if a zeppelin can exert 50 tons (100,000 pounds) of vertical buoyant force, then it can transport up to 500 people at a time, assuming an average weight of slightly less than 200 pounds per person (with briefcases, laptops, etc). If a spinnaker sail affixed to one end of such a zeppelin can tow the zeppelin from a rail terminal and/or parking garage, presumably located in a suburb, to a terminal located downtown, with close to zero fuel costs in at least one direction, that could reduce the use and crowding of other limited transport facilities, including roads, trains, etc. Similarly, if one or more zeppelins were available to carry people to or from crowded events (such as concerts, sporting events, etc.), they could reduce the waiting times, traffic delays, and energy wastes that arise from current crowd-flow systems.

4. People and/or freight can be carried by modular systems that can be suspended beneath a zeppelin, such as by a set of cables that are distributed across the top surface or frame of a modular unit. This can allow a modular transport unit to be loaded over a span of minutes (when passengers are involved) to hours (when freight is involved), before a zeppelin arrives at a "pickup" site. Using cables, winches, and hooks, a zeppelin can be coupled to a transport module within a few minutes, and it can lift and carry the transport module at a low and safe altitude, such as 50 to 100 feet higher than any nearby buildings, trees, or other potential obstacles. If a zeppelin needs to cross power transmission lines or other dangers, it can climb to a higher altitude, to provide a "cushion zone" for greater safety, and a transport module can be provided with strong and sturdy non-conductive hard rails mounted on shock-absorbing struts, for additional safety. If danger arises, the zeppelin can be designed to lower a transport module rapidly to the ground, by reeling out the suspension cables at any speed necessary to avoid a crisis.

5. A system of powered zeppelins can also haul very large items and/or heavy cargo or other loads on an "as needed" basis. For example, work such as road construction, sewer repair, bridge repair, and construction of mass-transit facilities often requires road segments to be closed for weeks or even months, causing serious traffic delays and disruptions, because it takes substantial time to fabricate and construct a large "subassembly" in a particular location. If major portions of a large subassembly (which may span an entire city block) can be assembled elsewhere and then lifted, transported to an intended location, and lowered slowly while workmen using cranes, cables, and winches guide it into place, road closures and other disruptions can be minimized, and the total costs of numerous projects can be reduced.

That type of function that can be provided by the SKY-HOOK™ zeppelin system, mentioned above. However, with very few exceptions, those types of zeppelins are not available to cities and suburbs. Accordingly, if a fleet of multiple zeppelins is acquired mainly for electric power generation, it can allow one or more zeppelins to be released from a power generation site for a few hours, to perform a lifting task that is needed by a local government, utility company, school, private company, or other entity. That type of multi-purpose, multi-use system can be more efficient and cost-effective than a system designed for only a single type of use.

Alternately or additionally, powered and steerable zeppelins would be able to respond in a manner comparable to tow-trucks, if a traffic accident or breakdown causes a car or truck to block or seriously hinder a major road. If an accident or breakdown occurs on a crowded road during rush hour, the tendency of cars to pack together tightly, on any road(s) leading to the accident, will make it difficult and time-consuming for a tow-truck to reach the site and remove the obstructing vehicles. A zeppelin could carry any or all of: (i) a pallet-type device, suspended from cables, for lifting relatively undamaged automobiles or similar vehicles, without inflicting any additional damage to the vehicles; (ii) a larger pallet for lifting larger trucks, tractors, and trailers; and, (iii) a chain-type harness that could be wrapped quickly around a wrecked vehicle, if additional damage to the already-wrecked vehicle during a lifting operation would not be important. The zeppelin could reach the site quickly, take aerial pictures for insurance and law-enforcement purposes, and clear the obstruction rapidly, by lifting away any disabled vehicles, and setting them down on any nearby road or parking lot.

6. If powered and steerable zeppelins were available, they also could be used to help promote public safety and security, in a manner that would be comparable to, but safer than, police helicopters. This possible use raises a number of complex societal issues which would need to be addressed carefully. Since the issues and potential problems raised by those potential uses are in the more distant future, and since they involve non-technical concerns and opinions that are outside the scope of a patent application, they are not addressed herein.

Thus, there has been shown and described a new and useful means for generating electric power, using buoyant aircraft and/or sail systems to lift and then release heavy car or train units that will generate electric power as they descend down a vertical or sloping track. Although this invention has been exemplified for purposes of illustration and description by reference to certain specific embodiments, it will be apparent to those skilled in the art that various modifications, alterations, and equivalents of the illustrated examples are possible. Any such changes which derive directly from the teachings herein, and which do not depart from the spirit and scope of the invention, are deemed to be covered by this invention.

The invention claimed is:

1. An electromechanical system for generating electric power, comprising:
   a. at least one traveling unit that weighs at least 5 tons and that is designed and suited to ascend and descend on a vertical or sloping track in a cyclic and reciprocating manner, wherein each descent of said traveling unit down said vertical or sloping track provides mechanical force that can be converted by said electromechanical system into electric power;
   b. a tensile subassembly that can be coupled to said traveling unit, and that can exert sufficient pulling force on said traveling unit to pull the traveling unit higher on said vertical or sloping track, wherein the pulling force can be released from the traveling unit once the traveling unit has reached an ascent height, thereby allowing the traveling unit to force rotation of at least one electric generator as the traveling unit descends the vertical or sloping track;
   c. at least one buoyant aircraft that is designed and suited to be filled with at least one buoyant gas, and that is capable of vertically lifting a mass weighing at least 5 tons, and that is provided with a reinforced frame that enables said buoyant aircraft to impose lifting and pulling force on said traveling unit, via said tensile subassembly;
   d. at least one sail component that is coupled via tensile members to said tensile subassembly, and that is designed and suited to be deployed, under windy conditions, in a manner that will generate pulling force that will be exerted on the traveling unit during each cyclic ascent of said traveling unit; and,
   e. at least one electrical generator that is suited for converting mechanical power into electric power,
   and wherein said electromechanical system is also provided with means for returning the buoyant aircraft, the sail component, and the tensile subassembly to locations that enable the buoyant aircraft, sail component, and tensile subassembly to be coupled again to the traveling unit after the traveling unit has descended down the vertical or sloping track, in a manner that will commence and cause another cyclic ascent of said traveling unit on the vertical or sloping track.

2. The electromechanical system of claim 1, wherein said electrical generator capable of converting mechanical power into electric power is mounted on said traveling unit.

3. The electromechanical system of claim 2, wherein said traveling unit also carries at least one battery component for temporary storage of electric power.

4. The electromechanical system of claim 1, wherein said buoyant aircraft has a nose end, a tail end, and a horizontally wide body shape that is designed to generate both:
   a. lifting force, when flown into wind at an ascending pitch with its nose end higher than its tail end; and,
   b. descending force, when flown into wind at a descending pitch with its nose end lower than its tail end.

5. The electromechanical system of claim 1, wherein said buoyant aircraft includes at least one gas compartment filled with hydrogen gas.

6. The electromechanical system of claim 1, wherein said sail component is coupled via cables to a cable-handling subassembly that contains at least one spreader bar, and that provides cable attachment locations at both a lower edge and an upper edge of said sail component, and that allows at least two cables attached to said sail component to be relaxed when said sail component is being returned to a location that enables the sail component to be coupled to a traveling unit at the beginning of an ascent of said traveling unit on the vertical or sloping track.

7. An electromechanical system for generating electric power, comprising:
   a. at least one traveling unit that weighs at least 5 tons and that is designed and suited to ascend and descend on a vertical or sloping track in a cyclic and reciprocating manner, wherein each descent of said traveling unit down said vertical or sloping track provides mechanical force that can be converted by said electromechanical system into electric power;
   b. a tensile subassembly that can be coupled to said traveling unit, and that can exert sufficient pulling force on said traveling unit to pull the traveling unit higher on said vertical or sloping track, wherein the pulling force can be released from the traveling unit once the traveling unit has reached an ascent height, thereby allowing the traveling unit to force rotation of at least one electric generator as the traveling unit descends the vertical or sloping track;
   c. at least one buoyant aircraft that is designed and suited to be filled with at least one buoyant gas, and that is capable of vertically lifting a mass weighing at least 5 tons, and that is provided with a reinforced frame that enables said buoyant aircraft to impose lifting and pulling force on said traveling unit, via said tensile subassembly; and,
   d. at least one electrical generator that is suited for converting mechanical power into electric power,
   and wherein said electromechanical system is also provided with means for returning the buoyant aircraft and the tensile subassembly to locations that enable the buoyant aircraft and the tensile subassembly to be coupled again to the traveling unit after the traveling unit has descended down the vertical or sloping track, in a manner that will commence and cause another cyclic ascent of said traveling unit on the vertical or sloping track.

8. The electromechanical system of claim 7, wherein said electrical generator capable of converting mechanical power into electric power is mounted on said traveling unit.

9. The electromechanical system of claim 8, wherein said traveling unit also carries at least one battery component for temporary storage of electric power.

10. The electromechanical system of claim 7, wherein said buoyant aircraft has a nose end, a tail end, and a horizontally wide body shape that is designed to generate both:
    a. lifting force, when flown into wind at an ascending pitch with its nose end higher than its tail end; and, b. descending force, when flown into wind at a descending pitch with its nose end lower than its tail end.

11. The electromechanical system of claim 7, wherein said buoyant aircraft includes at least one gas compartment filled with hydrogen gas.

12. An electromechanical system for generating electric power, comprising:
   a. at least one traveling unit that weighs at least 5 tons and that is designed and suited to ascend and descend on a vertical or sloping track in a cyclic and reciprocating manner, wherein each descent of said traveling unit down said vertical or sloping track provides mechanical force that can be converted by said electromechanical system into electric power;
   b. a tensile subassembly that can be coupled to said traveling unit, and that can exert sufficient pulling force on said traveling unit to pull the traveling unit higher on said vertical or sloping track, wherein the pulling force can be released from the traveling unit once the traveling unit has reached an ascent height, thereby allowing the traveling unit to force rotation of at least one electric generator as the traveling unit descends the vertical or sloping track;
   c. at least one sail component that is coupled via tensile members to said tensile subassembly, and that is designed and suited to be deployed, under windy conditions, in a manner that will generate pulling force that will be exerted on the traveling unit during each cyclic ascent of said traveling unit; and,
   d. at least one electrical generator that is suited for converting mechanical power into electric power, and wherein said electromechanical system is also provided with means for returning the sail component and the tensile subassembly to locations that enable the sail component, and tensile subassembly to be coupled again to the traveling unit after the traveling unit has descended down the vertical or sloping track, in a manner that will commence and cause another cyclic ascent of said traveling unit on the vertical or sloping track.

13. The electromechanical system of claim 12, wherein said sail component is coupled via cables to a cable-handling subassembly that contains at least one spreader bar, and that provides cable attachment locations at both a lower edge and an upper edge of said sail component, and that allows at least two cables attached to said sail component to be relaxed when said sail component is being returned to a location that enables the sail component to be coupled to a traveling unit at the beginning of an ascent of said traveling unit on the vertical or sloping track.

14. The electromechanical system of claim 12, wherein said sail component is coupled to a sail-lifting device capable of keeping the sail component elevated above any stationary elements.

* * * * *